(12) United States Patent
Jones et al.

(10) Patent No.: US 8,325,229 B2
(45) Date of Patent: Dec. 4, 2012

(54) CAMERA HAVING A SLIP RING AND PAN-TILT MECHANISM

(75) Inventors: Theodore L. Jones, Akron, PA (US); Richard Wright, Reinholds, PA (US)

(73) Assignee: Robert Bosch GmbH, Stuttgart (DE)

( * ) Notice: Subject to any disclaimer, the term of this patent is extended or adjusted under 35 U.S.C. 154(b) by 807 days.

(21) Appl. No.: 12/323,749

(22) Filed: Nov. 26, 2008

(65) Prior Publication Data
US 2010/0128122 A1    May 27, 2010

(51) Int. Cl.
*H04N 7/18* (2006.01)

(52) U.S. Cl. .. 348/143; 348/86; 348/E5.03; 348/333.06; 348/151

(58) Field of Classification Search .................... 348/143
See application file for complete search history.

(56) References Cited

U.S. PATENT DOCUMENTS

| | | | |
|---|---|---|---|
| 4,457,610 A * | 7/1984 | Kawazoe | 396/428 |
| 4,744,763 A | 5/1988 | Suzuki et al. | |
| 5,394,209 A | 2/1995 | Stiepel et al. | |
| 5,484,294 A | 1/1996 | Sobhani | |
| 5,575,664 A | 11/1996 | Sobhani | |
| 5,581,440 A | 12/1996 | Toedter | |
| 5,627,616 A | 5/1997 | Sergeant et al. | |
| 6,461,021 B1 | 10/2002 | Warnecke | |
| 6,479,813 B2 | 11/2002 | Takada et al. | |
| 6,517,357 B1 | 2/2003 | Athanasiou et al. | |
| 6,628,338 B1 * | 9/2003 | Elberbaum et al. | 348/373 |
| 6,715,940 B2 * | 4/2004 | Top et al. | 396/427 |
| 6,768,233 B2 | 7/2004 | Angerpointner | |
| 6,793,415 B2 | 9/2004 | Arbuckle | |
| 6,797,891 B1 | 9/2004 | Blair et al. | |
| 6,965,411 B1 | 11/2005 | Jones | |
| 7,145,411 B1 | 12/2006 | Blair et al. | |
| 7,336,139 B2 | 2/2008 | Blair et al. | |
| 2003/0137842 A1 | 7/2003 | Chang | |
| 2003/0194230 A1 | 10/2003 | Tamura | |
| 2004/0216152 A1 * | 10/2004 | Ezawa et al. | 720/659 |
| 2006/0003604 A1 * | 1/2006 | Angerpointner | 439/13 |
| 2006/0269278 A1 * | 11/2006 | Kenoyer et al. | 396/428 |
| 2007/0230946 A1 | 10/2007 | Kimura | |

FOREIGN PATENT DOCUMENTS

| | | |
|---|---|---|
| EP | 0944133 | 9/1999 |
| WO | 95/35624 | 12/1995 |

OTHER PUBLICATIONS

European Patent Office Action for Application No. 09012958.6 dated Mar. 5, 2010 (9 pages).

* cited by examiner

*Primary Examiner* — Tonia L Dollinger
*Assistant Examiner* — June Sison
(74) *Attorney, Agent, or Firm* — Michael Best & Friedrich LLP

(57) ABSTRACT

A camera system having a camera lens module, a slip ring connector, and a pan/tilt mechanism. In one construction, the camera system includes a circuit board, a slip ring having a stator connected to the circuit board and a rotor rotatable with respect to the stator, a camera lens module, and a flexible flat cable. The camera system can also include an anti-rotation arm connected to the rotor and in contact with a first end of the flexible flat cable. The anti-rotation arm can prevent a twist of the flexible flat cable during panning of the camera lens module.

22 Claims, 17 Drawing Sheets

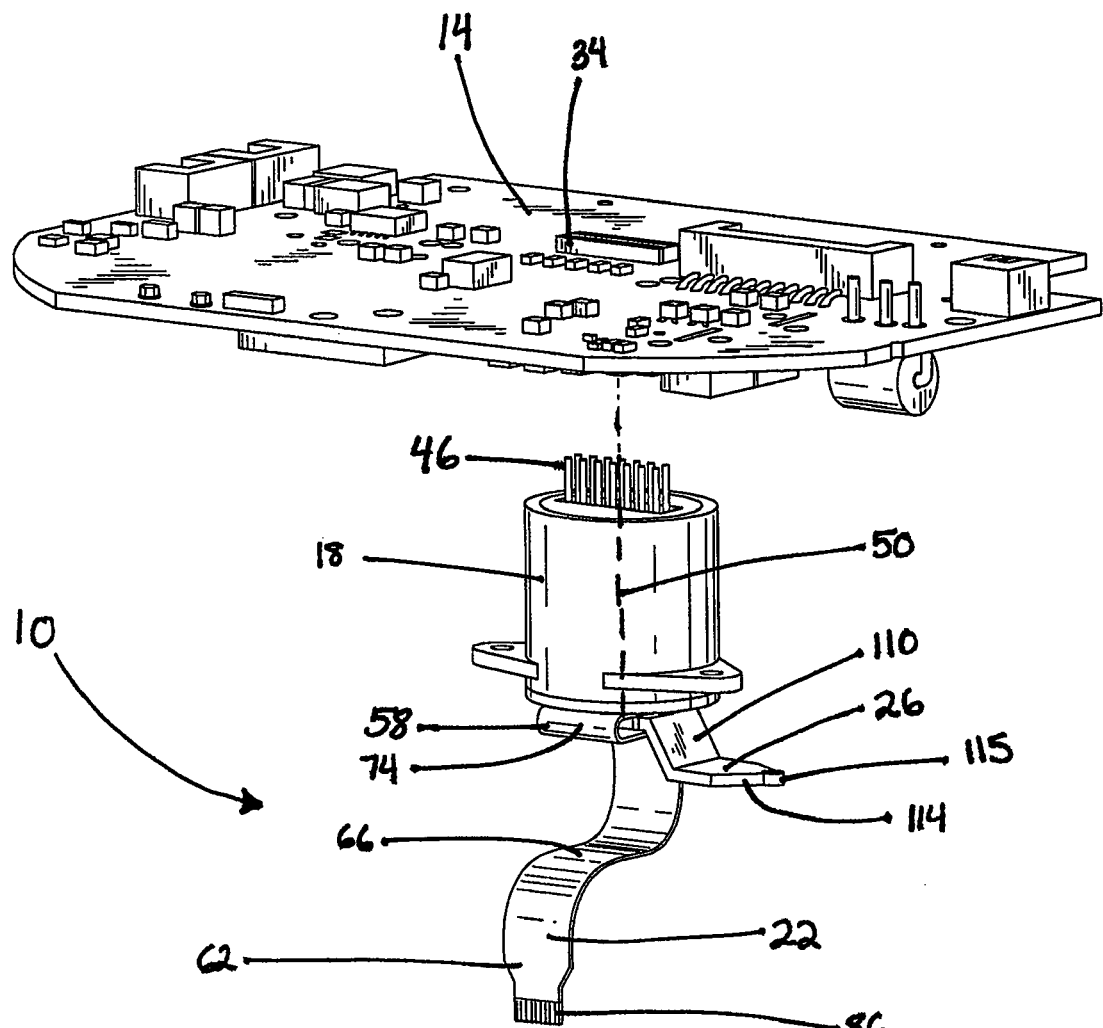
FIG. 3
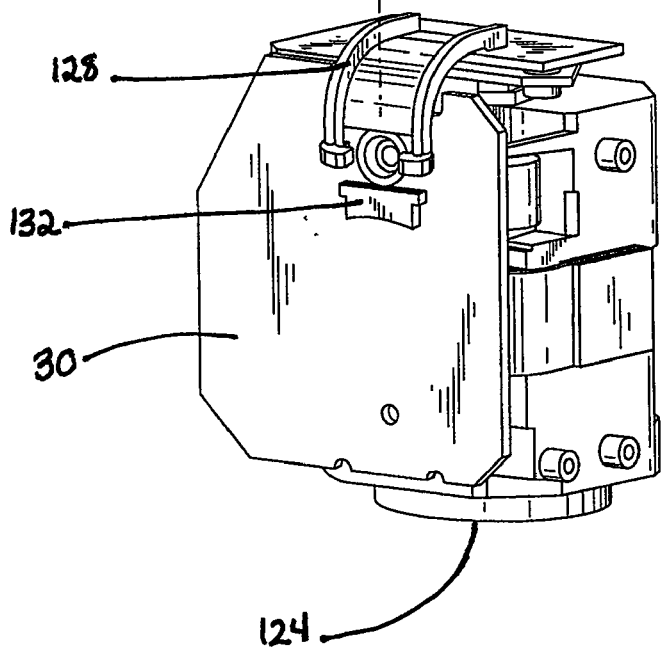

| Motor Direction and Speed | Panning Right | Panning Left | No Pan |
|---|---|---|---|
| Tilting Up | Pan motor pos ↑<br>Tilt motor pos ↑<br>Tilt vel < Pan vel | Pan motor pos ↓<br>Tilt motor pos ↓<br>Tilt vel < Pan vel | Pan motor vel = 0<br>Tilt motor pos ↑ |
| Tilting Down | Pan motor pos ↑<br>Tilt motor pos ↑<br>Tilt vel > Pan vel | Pan motor pos ↓<br>Tilt motor pos ↓<br>Tilt vel > Pan vel | Pan motor vel = 0<br>Tilt motor pos ↓ |
| No Tilt | Pan motor pos ↑<br>Tilt motor pos ↑<br>Tilt vel = Pan vel | Pan motor pos ↓<br>Tilt motor pos ↓<br>Tilt vel = Pan vel | Pan motor vel = 0<br>Tilt motor vel = 0 |

Differential Drive Pan and Tilt Motor Position Table

FIG. 19

CAMERA HAVING A SLIP RING AND PAN-TILT MECHANISM

FIELD OF THE INVENTION

The invention relates to a camera system. In some embodiments, the invention includes a camera system having a camera lens module, a slip ring connector, and a pan/tilt mechanism.

BACKGROUND

There are several advantages of a camera that is capable of moving to change its field of view. For example, a camera configured to pan and tilt is capable of scanning multiple areas. Such a camera might also be capable of following a moving object (at least for some limited period of time). Cameras (or portions of cameras) can often be tilted and panned to achieve a range of viewing angles. Such cameras must include a device or system to move the camera or portions of the camera to provide panning and tilting.

SUMMARY

The following summary sets forth certain embodiments of the invention. However, it does not set forth all possible embodiments. In addition, variations and modifications of the embodiments described are possible.

In addition to having a device to move the camera or portions of the camera, a mechanism may be used to transfer image information from the camera or a portion of the camera that is moving to a stationary device (such as another portion of the camera, a video display, an image recorder, or other device). In many instances, electrical signals transmit from a moving component to a stationary component and vice-versa, and power transmits from the stationary component to the moving component. In some instances, the signals are transmitted through a wired or mechanical connection rather than a wireless connection. As a consequence, a number of camera components (including electrical components) are subjected to forces from panning and tilting. A system to manage stress and strain in various camera elements during the tilting and panning motions eases rotation and increases the longevity of certain components. For example, flex cable tape can be used to provide an effective way to make electrical connections between moving and non-moving portions of the camera. However, if the stress in the flex cable tape is not managed, inner conductive traces in the tape can fatigue and fail, interrupting or blocking the transmission of electrical signals between moving and fixed parts of the camera.

In one embodiment, the invention provides a camera system comprising a circuit board, a slip ring having a stator connected to the circuit board and a rotor rotatable with respect to the stator, a camera lens module, and a flexible flat cable. The flexible flat cable includes a first end electrically connected to pins of the rotor, a second end electrically connected to the camera lens module, and a flexible tilt region located between the first end and the second end. The flexible tilt region is bendable along a length when the camera lens module tilts. The camera system further includes an anti-rotation arm connected to the rotor and in contact with the first end of the flexible flat cable. The anti-rotation arm includes recesses to receive the pins and substantially prevents a twist of the flexible flat cable during panning of the camera lens module.

In another embodiment, the invention provides a method of connecting a camera lens module of a camera system to a circuit board using a slip ring, an anti-rotation arm, and a pan-tilt mechanism. The slip ring has a stator and a rotor. The rotor has pins and is rotatable with respect to the stator. The method includes connecting the slip ring to the circuit board, receiving the pins of the rotor in recesses of the anti-rotation arm, electrically connecting the rotor pins to a first end of a flexible flat cable, positioning the first end of the flexible flat cable in contact with the anti-rotation arm, electrically connecting a second end of the flexible flat cable to the camera lens module, electrically connecting the circuit board to a pan-tilt mechanism, and connecting the pan-tilt mechanism to the camera lens module. The connecting the pan-tilt mechanism to the camera lens module includes configuring the anti-rotation arm to rotate the same amount and direction as the camera lens module, and configuring the flexible flat cable to bend in one plane.

In yet another embodiment, the invention provides a differential drive system configured to pan and tilt a camera lens module about a pan and tilt axis, respectively. The differential drive system includes a pan motor having a pan motor shaft, a tilt motor having a tilt motor shaft, a stationary ring having a center aperture, a pan ring having a center aperture, and a tilt ring having a center aperture. The pan and tilt motor shafts extends through the center aperture of the stationary ring, the pan ring is received within the center aperture of the stationary ring and is rotatable about the pan axis with respect to the stationary ring, and the tilt ring is received within the center aperture of the stationary ring and is rotatable about the pan axis with respect to the pan ring and to the stationary ring. The differential drive system further includes a support plate connected to the pan ring, a tilt bracket connected to the support plate, and a tilt gear sector. The support plate has a center aperture and a retaining aperture, the tilt bracket has a tilt gear aperture, and the tilt gear sector has a portion extending through the retaining aperture of the support ring and in contact with the tilt ring. The rotation of the tilt motor shaft causes rotation of the tilt ring about the pan axis, and rotation of the tilt gear sector about the tilt axis. The rotation of the pan motor shaft causes rotation of the pan ring, the support ring, the tilt bracket, and the tilt gear sector about the pan axis.

Other aspects of the invention will become apparent by consideration of the detailed description and accompanying drawings.

BRIEF DESCRIPTION OF THE DRAWINGS

FIG. 3 is an exploded perspective view of the camera module and slip ring system of FIG. 1 showing a flat flexible cable disconnected from a connector.

FIG. 19 is a table showing motor operating direction and speed for the motors of the differential drive system of FIG. 10.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
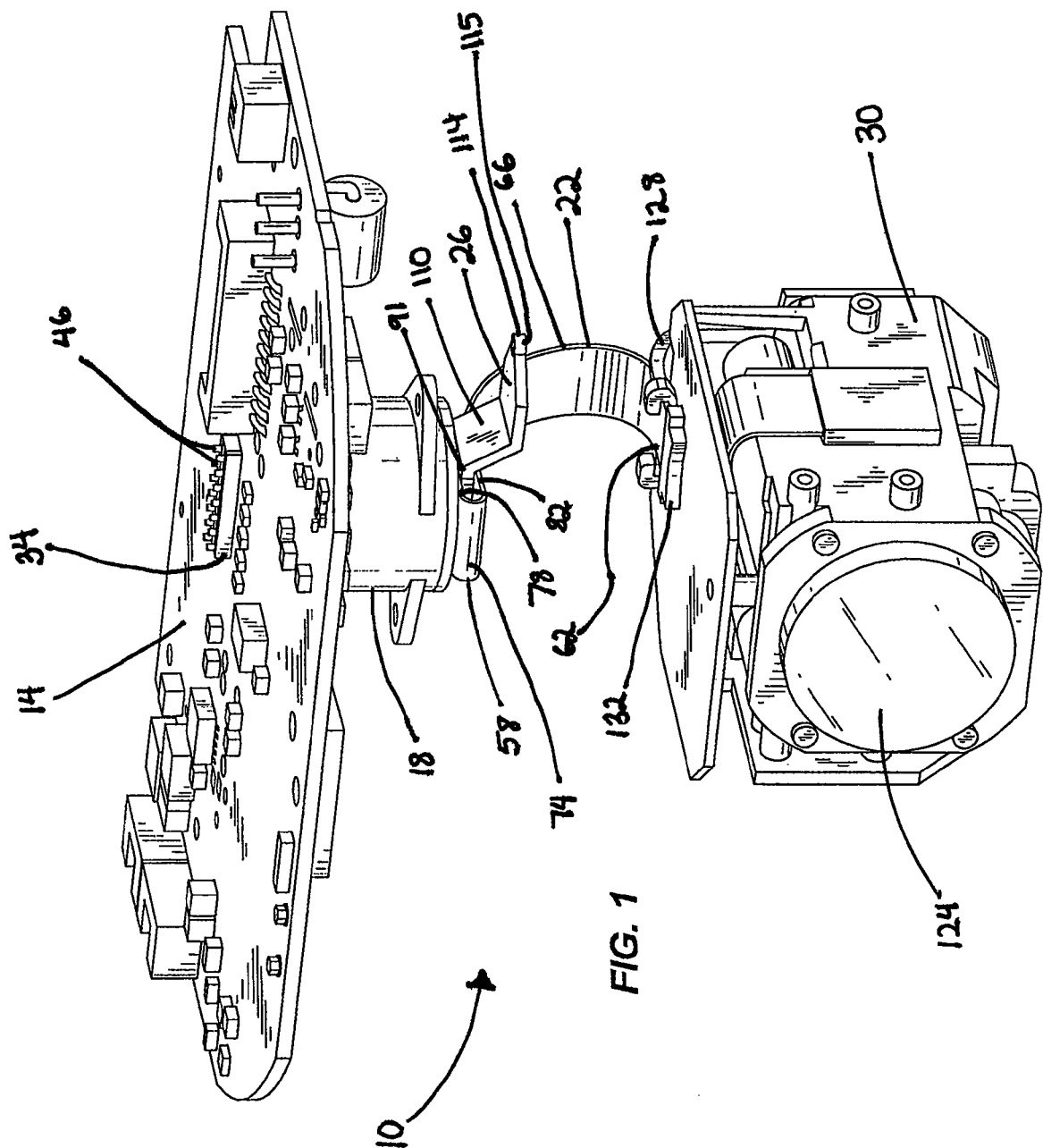
FIG. 1 is a perspective view of a camera module and slip ring system.
Figure 2:
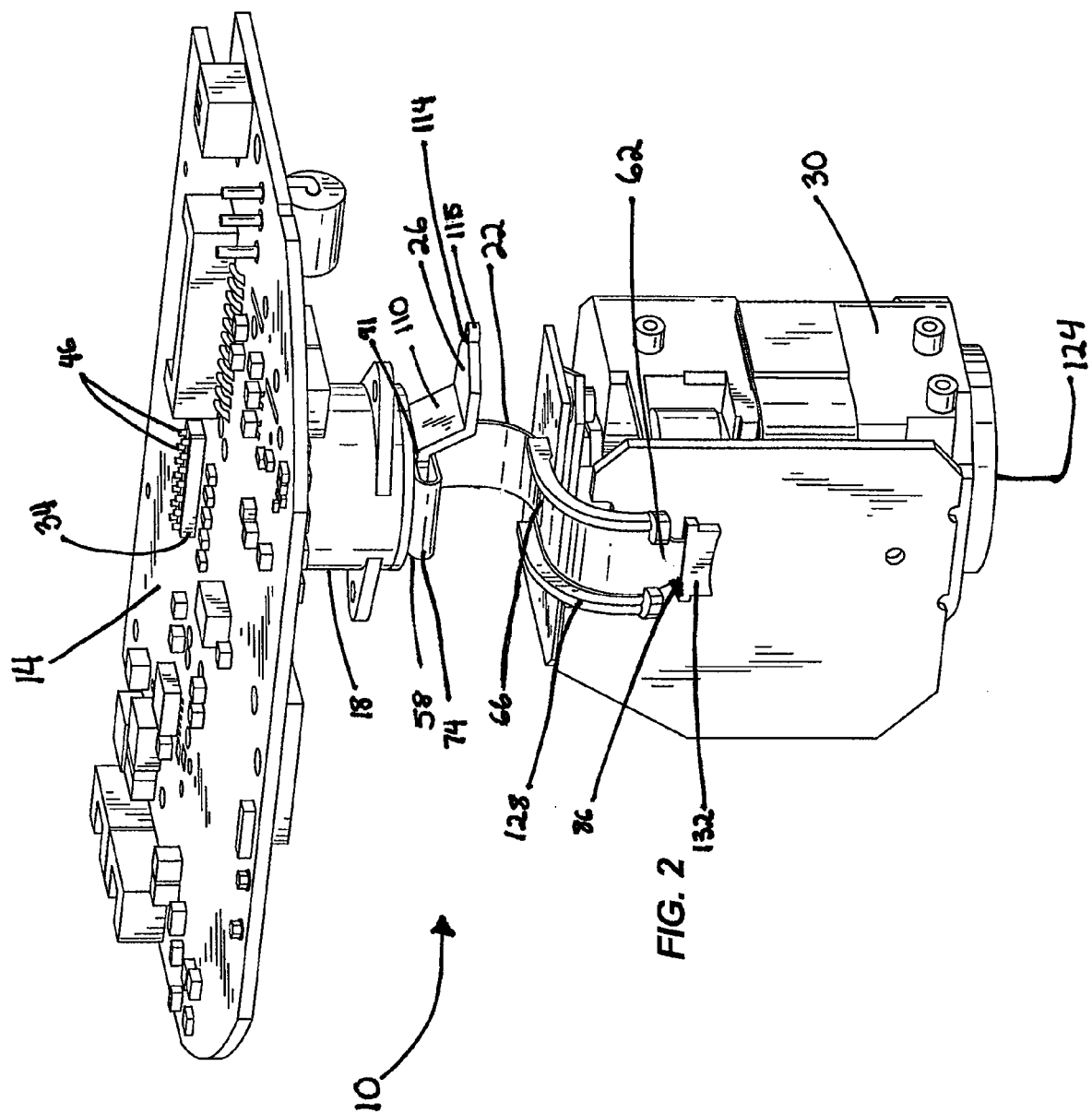
FIG. 2 is another perspective view of the camera module and slip ring system of FIG. 1 showing a camera lens module tilted down.

A camera module and slip ring system 10 is illustrated in FIG. 1. As can be best seen in FIGS. 1-3, the portion generally includes a circuit board 14, a slip ring 18, a flexible flat cable 22, an anti-rotation arm 26, and a camera lens module 30. The slip ring 18 is connected to the circuit board 14 and to the flexible flat cable 22. The anti-rotation arm 26 is coupled to the slip ring 18 and the flexible flat cable 22. The camera lens module 30 is connected to the flexible flat cable 22 and is configured to rotate with a tilt motion and a pan motion. As will be described in greater detail later, the term "camera lens module" generally refers to an assembly of elements that are configured to pan or tilt as a unit with the lens of the camera. In FIG. 1, the camera lens module 30 is illustrated in a horizontal (un-tilted) position. FIG. 2 illustrates the camera lens module 30 in a tilted down position. FIG. 3 illustrates how the slip ring connects to the circuit board 14 and to the module 30. Additional details about the components and how they are connected are provided below.

Figure 4:
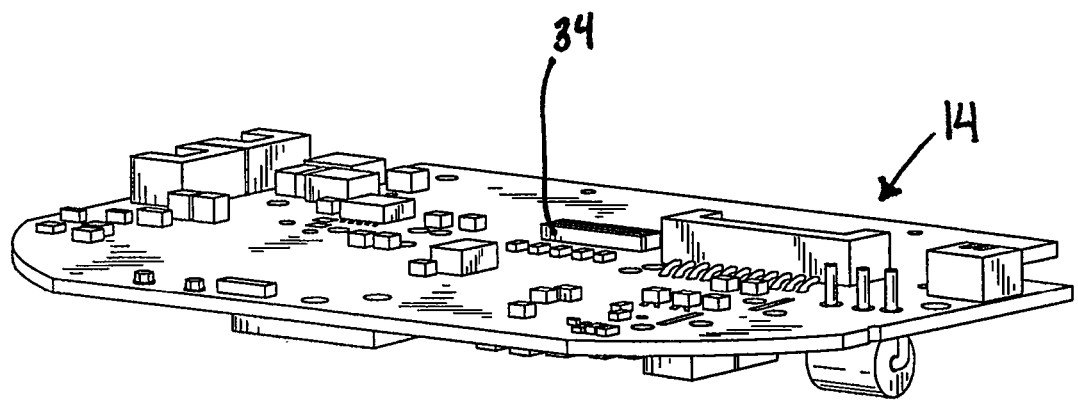
FIG. 4 is a perspective view of a circuit board of the camera module and slip ring system of FIG. 1.

FIG. 4 illustrates the circuit board 14. The circuit board 14 includes a central processing unit, a microcontroller, or the like configured (e.g., by programming or software) to control components of the camera. For example, the central processing unit controls motors used to cause panning and tilting motions and/or components for adjusting the focus of the camera. The circuit board 14 also includes image processing circuits, and memory or storage devices. Generally, the circuit board 14 is stationary with respect to the camera lens module 30 and may be located in a housing. The circuit board 14 also includes a top-side plug or connector 34 for connecting the circuit board 14 to the slip ring 18 through holes in the circuit board.

Figure 6A:
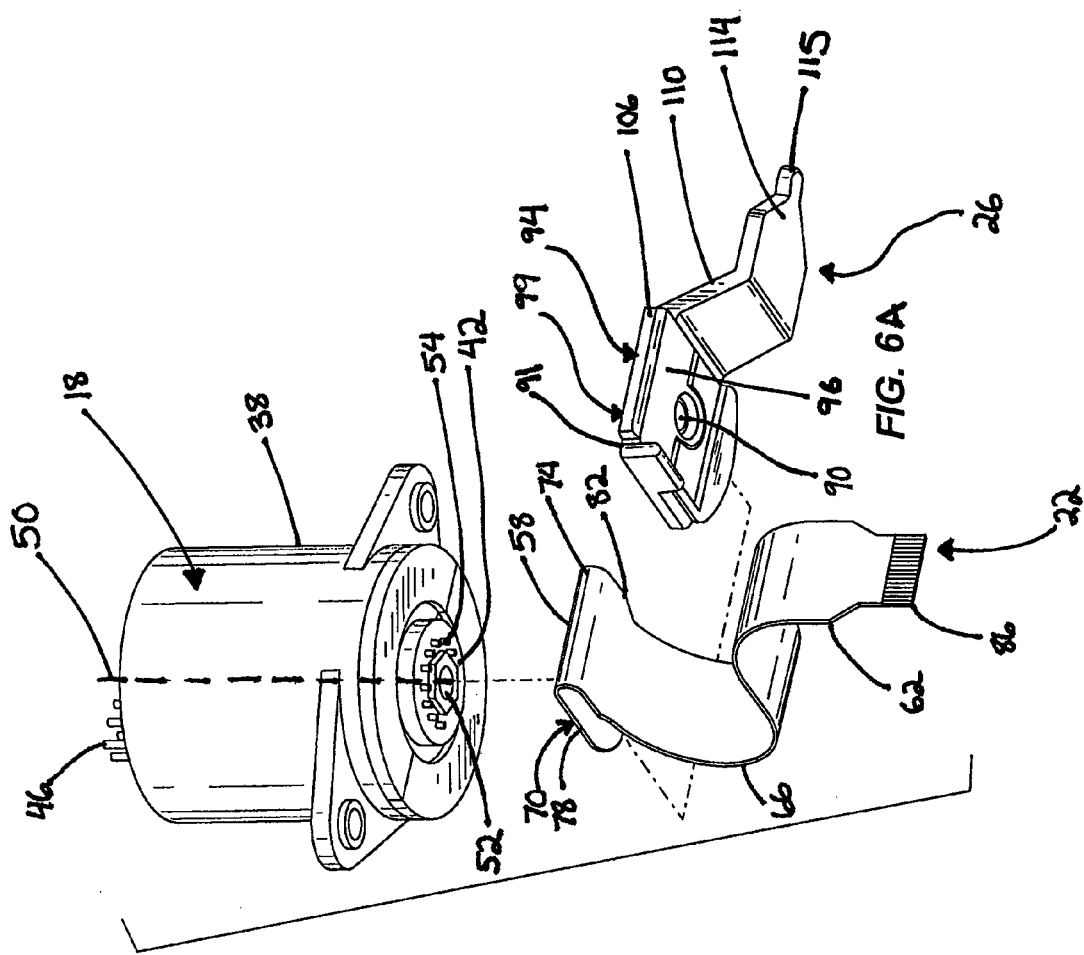
FIG. 6A is an exploded perspective view of the slip ring, the anti-rotation arm, and the flexible flat cable of the camera module and slip ring system of FIG. 1.
Figure 5:
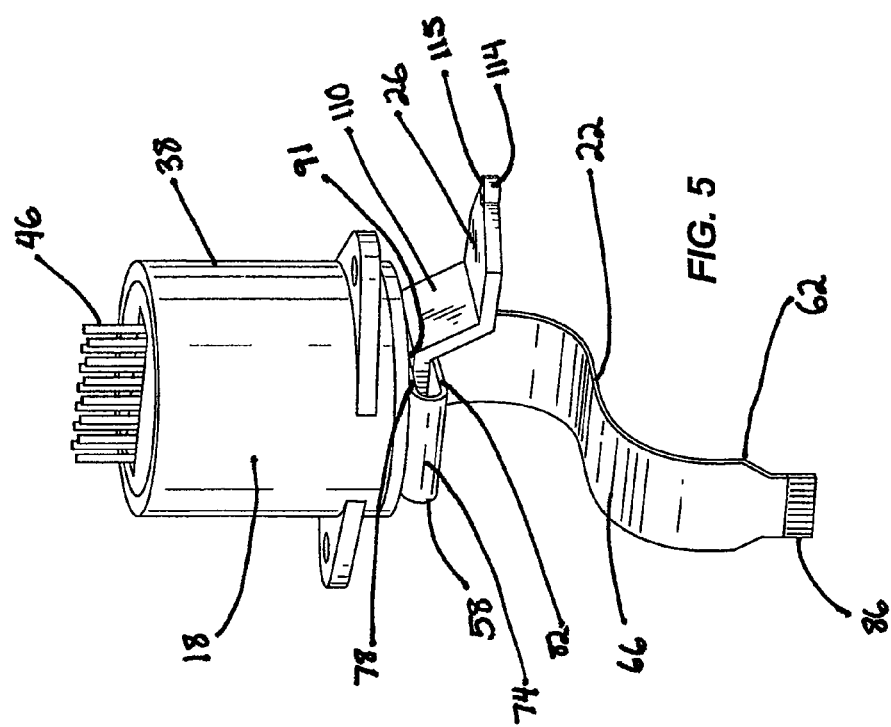
FIG. 5 is a perspective view of a slip ring, an anti-rotation arm, and a flexible flat cable of the camera module and slip ring system of FIG. 1.
Figure 6B:
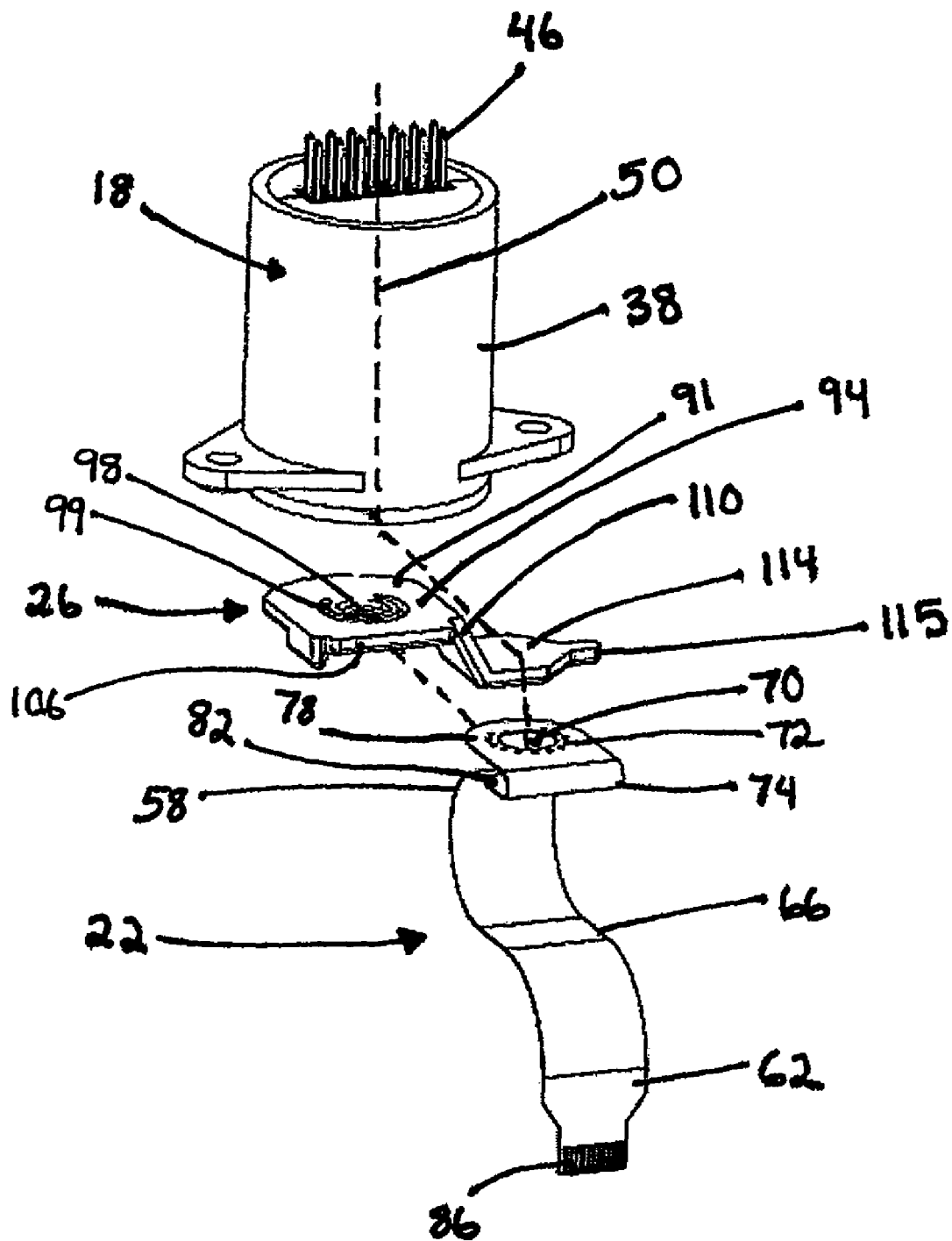
FIG. 6B is another exploded perspective view of the slip ring, the anti-rotation arm, and the flexible flat cable of the camera module and slip ring system of FIG. 1.

FIGS. 5 and 6 illustrate the slip ring 18, the flexible flat cable 22, and the anti-rotation arm 26. The slip ring 18 includes a stator 38 and a rotor 42. The stator 38 includes header pins 46 that pass through the holes in the circuit board 14. The pins 46 are connected to the top-side connector 34 to mechanically support and electrically interface the circuit board 14 with the slip ring 18. In some constructions, the header pins 46 are soldered to the circuit board 14. The stator 38 is stationary and the rotor 42 is rotatable with respect to the stator 38 about a central vertical axis 50 of the slip ring 18. The rotor 42 has a shaft 52 extending at least partially along the central vertical axis 50. The shaft 52 includes electrically conductive pins 54. The rotor shaft 52 can be a cylinder, a hexagonal prism, or prism of another geometric shape. More specifically, the shaft 52 can include a portion that is cylindrical and another portion that is a hexagonal prism (cross-sectional is a hexagon) (FIG. 6A) or another geometric shape. As discussed in greater detail below, the hexagonal portion is shaped to fit within and connect to another hexagonal shaped connector or aperture so as to engage the anti-rotation arm when the shaft is rotated. In some configurations, the rotor 42 is an internal cylindrical element of the slip ring 18 that includes rings arranged longitudinally along the central vertical axis 50 of the slip ring 18 and constrained on one side of a rotating joint. Each ring has a separate continuous cylindrical surface on which brushes make continuous contact to complete an electrical circuit. The brushes are held in position by and terminate on the stator 38, which is constrained on the other side of the rotating joint.

The flexible flat cable 22 can be a flex cable tape, ribbon cable, or a similar electrical cable. In some configurations, the flexible flat cable 22 is electromagnetically shielded. In such configurations, the flexible flat cable 22 has additional conductive layers on or in its outer surfaces to help prevent electromagnetic interference (EMI) from affecting signals transmitted in the cable. The flexible flat cable 22 has a first end 58, a second end 62, and a flexible tilt region 66 located between the first end 58 and the second end 62. The first end 58 includes an aperture 70 through which the rotor shaft 52 passes and holes 72 for receiving the pins 54 of the rotor, providing an electrical connection between the slip ring 18 and the flexible flat cable 22. In some configurations, the pins 54 are soldered within the holes 72 of the flexible flat cable 22, creating solder joints. The first end 58 also includes a bend 74 so that the flexible flat cable 22 can be wrapped about the anti-rotation arm 26. As illustrated, the bend 74 is between an upper portion 78 and a lower portion 82. The upper and lower portions 78 and 82 reside in substantially parallel planes. The upper and lower portions 78 and 82 are separated from one another by a distance such that the anti-rotation arm 26 fits between the portions. The flexible tilt region 66 has electrically conductive elements. The second end 62 of the flexible flat cable 22 includes contacts 86 for electrically connecting the flexible flat cable 22 to the camera lens module 30. The flexible flat cable 22 electrically and mechanically connects the slip ring 18 to the camera lens module 30. As will be discussed in greater detail below, the flexible flat cable 22 is configured to bend in one plane, and is further configured to resist twisting in other planes.

The anti-rotation arm 26 includes a plate 91 having an upper surface 94 and a lower surface 96. The upper surface 94 is substantially planar and has a pocket or socket 98 for receiving the rotor shaft 52. In the construction illustrated in FIGS. 6A and 6B, the pocket 98 is hexagonal, or a hex pocket (FIG. 6B), for coupling to the hexagonal portion of the rotor shaft 52. In some configurations, the pocket 98, or a portion of the pocket, extends through the anti-rotation arm 26 to provide a passage 90 for a screw, or similar fastening device. The screw is tightened to the shaft 52 through the pocket 98 to mechanically connect the anti-rotation arm 26 to the rotor 42. The upper surface 94 includes a recessed groove 99 which provides clearance for the pins 54 of the rotor 42 that extend through the flexible flat cable 22. The lower surface 96 of the anti-rotation arm 26 is substantially planar and generally smooth. As previously discussed, the bend 74 of the flexible flat cable 22 is wrapped around the anti-rotation arm 26 such that the anti-rotation arm 26 is received within the bend 74 at the first end 58. The upper surface 94 is in contact with the upper portion 78 of the bend 74 and the lower surface 96 is in contact with the lower portion 82. The portion of the bend 74 between the upper and lower portions contacts a flat support edge 106 of the anti-rotation arm 26. In some configurations, 3M™ VHB™ tape, or a similar type of tape, can be placed between the lower surface 96 of the anti-rotation arm 26 and the lower portion 82 of the bend of the flexible flat cable. The tape provides strain relief for the cable. An inclined region 110 of the anti-rotation arm 26 extends from the plate 91 between the upper and lower portions 78 and 82. The inclined region 110 slopes downward from the plate 91 at an oblique angle and is connected to coupling structure 114. In some constructions, the coupling structure 114 is located at an end of the anti-rotation arm 26 and narrows to form a tab 115 (see FIGS. 1-6B).

Figure 7:
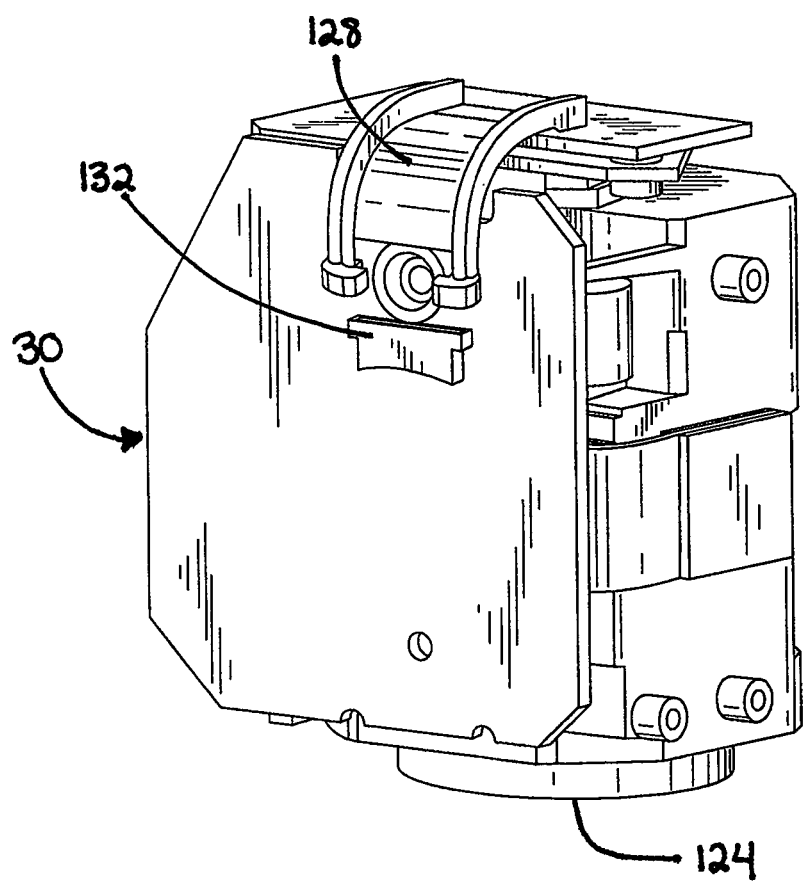
FIG. 7 is a perspective view of a camera lens module of the camera module and slip ring system of FIG. 1.

FIG. 7 illustrates the camera lens module 30. The camera lens module 30 has a camera lens 124. A curved cable guide or tray 128 is connected to the camera lens module 30 and is configured to receive a portion of the flexible flat cable 22 (see FIGS. 2 and 9). The camera lens module 30 includes a flexible flat cable connector 132 which is configured to connect to the contacts 32 of the flexible flat cable 22. In some configurations, the flexible flat cable connector 132 includes a zero insertion force (ZIF) feature. The cable 22 is coupled to the ZIF connector by lifting a lever or cam bar on the connector so that the contacts 86 fit within the connector, then pressing the lever or bar onto the cable 22 to grip the contacts 86 within the connector 132. The ZIF feature provides a mechanism for electrically connecting the cable 22 to the camera lens module 30 without using an insertion force, which could damaging the contacts on the cable 22 or within the connector 132. In alternative configurations, the flexible flat cable connector 132 is a traditional cable plug or socket connector. In one construction, the flexible flat cable 22 is partially secured to the cable tray 128 with 3M™ VHB™ tape, or similar type of tape. The 3M™ VHB™ tape is placed at the second end 62 near the connector 132, to allow the flexible tilt region 66 to separate from the cable tray 128.

The camera module and slip ring system 10 electrically connects the circuit board 14 to the camera lens module 30. The circuit board 14 sends and receives information to and from the camera lens module 30, such as control signals for capturing an image, information for storing a captured image, and the like. One or more electrical signals from the components on the circuit board 14 are transmitted through the header pins 46 to the slip ring 18 (specifically, from the circuit board 14 to the stator 38 and from the stator 38 to the rotor 42). From the slip ring 18, the rotor pins 54 transmit the electrical signals to the first end 58 of the flexible flat cable 22. The flexible flat cable 22 conducts the signals from the first end 58, through the conductive elements, to the second end 62. The electrical signals are transmitted by the contacts 86 of the flexible flat cable 22 through the flexible flat cable connector 132 to the camera lens module 30.

Figure 8:
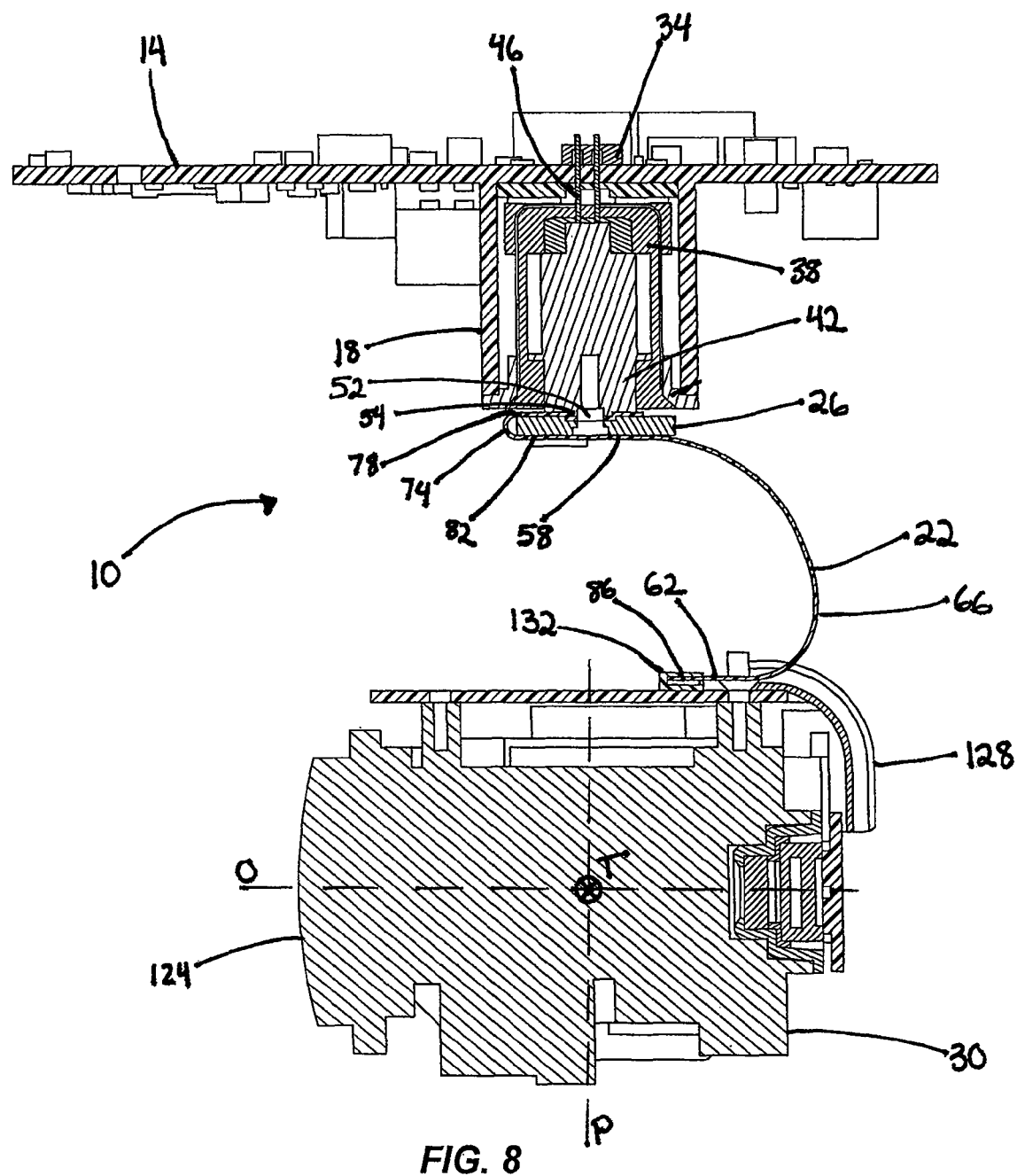
FIG. 8 is a cross-sectional view of the camera module and slip ring system of FIG. 1.
Figure 9:
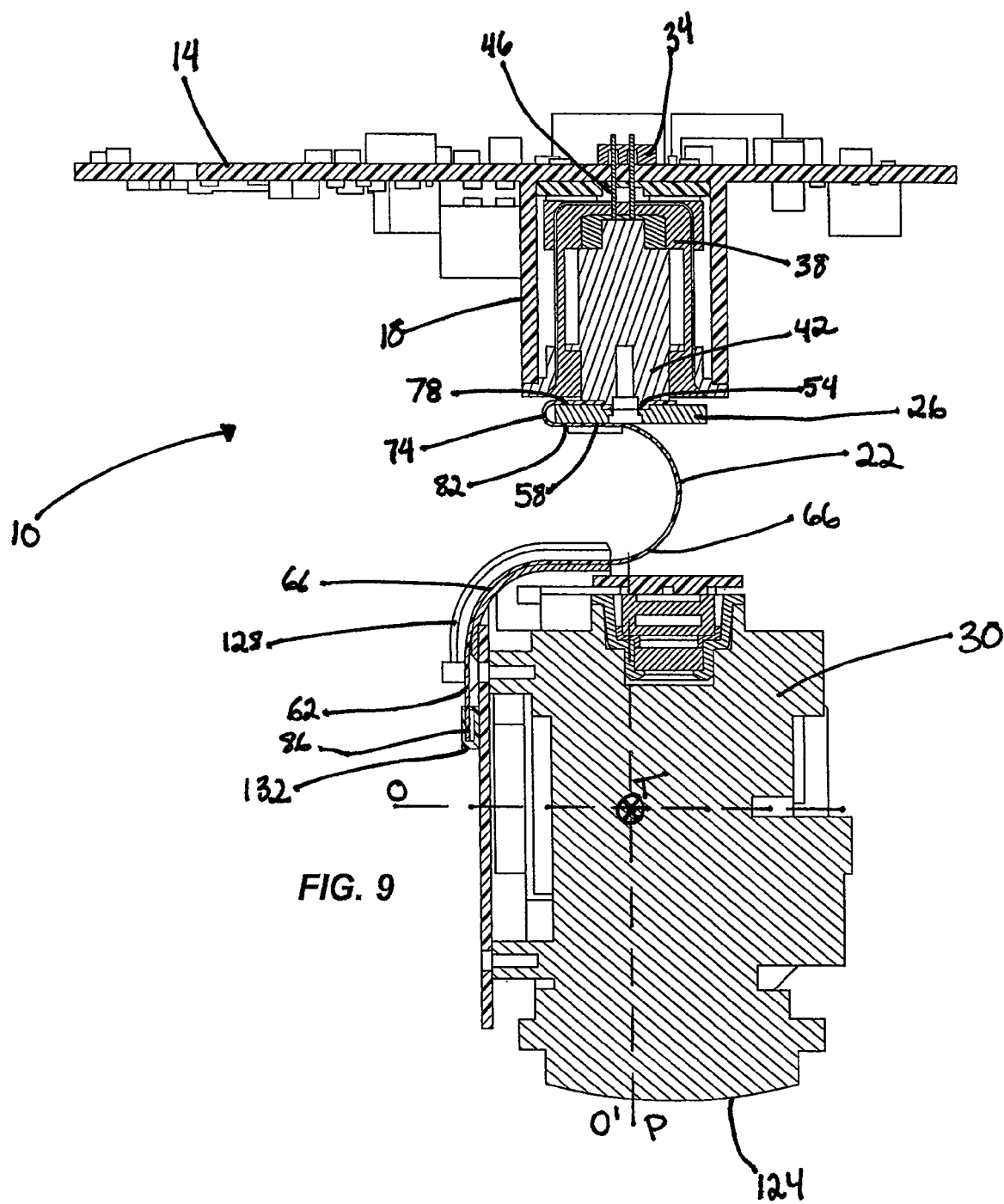
FIG. 9 is a cross-sectional view of the camera module and slip ring system of FIG. 1 showing the camera lens module tilted down.
Figure 10:
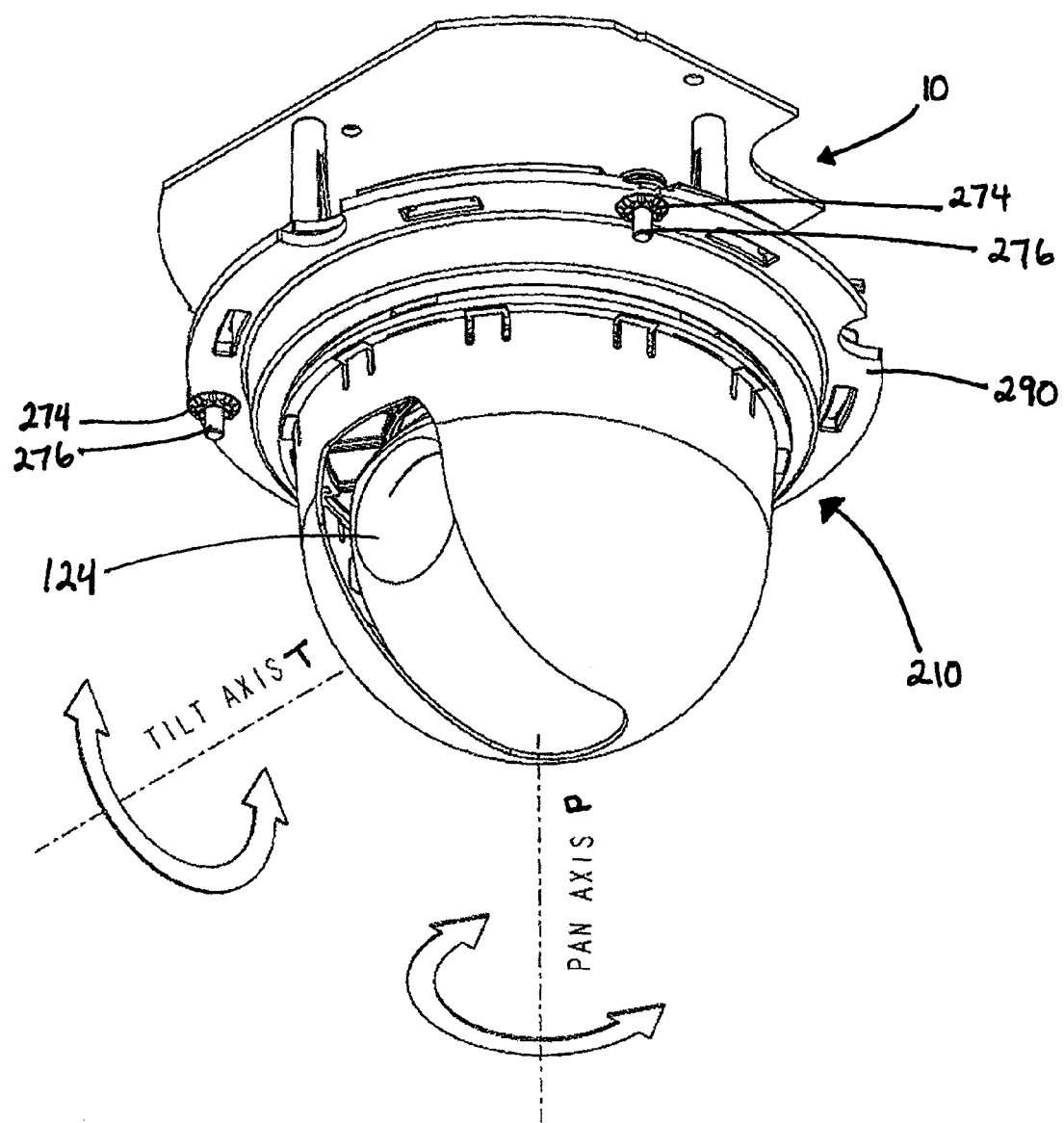
FIG. 10 is a perspective view of a dome camera having the camera module and slip ring system of FIG. 1 and a differential drive system.

As shown in FIGS. 8 and 9 the camera lens module 30 is configured to tilt and pan (also see FIGS. 1 and 2). The camera lens module 30 tilts about a horizontal tilt axis T and pans about a vertical pan axis P. The tilt axis T is established by the structure of the camera lens module 30 and is substantially orthogonal to the pan axis P. The tilt axis T rotates about the pan axis P with the camera lens module 30 during panning. The pan axis P is stationary with respect to the system 10 and runs generally through the central vertical axis 50 of the slip ring 18. The camera lens module 30 also has a viewing axis O representing a viewing direction of the camera lens 124. The viewing axis O is substantially orthogonal to both axes T and P while the camera lens module 30 is in a horizontal, un-tilted position, before tilting or panning. During tilting and panning of the camera lens module 30, the viewing axis O rotates with the camera lens 124 to a substantially new viewing direction, represented by a new viewing axis O'.

FIGS. 10-13 and 18 illustrate the camera module and slip ring system 10 coupled with a pan-tilt mechanism to control panning, tilting, and combined panning-tilting motions of the camera lens module 30. In some constructions, the pan-tilt mechanism is a standard pan-tilt system including a pan motor for initiating panning of a pan stage and a tilt motor for initiating tilting of a tilt stage. In one construction, the pan-tilt mechanism is a differential drive system 210 (FIGS. 11-18).

Figure 11:
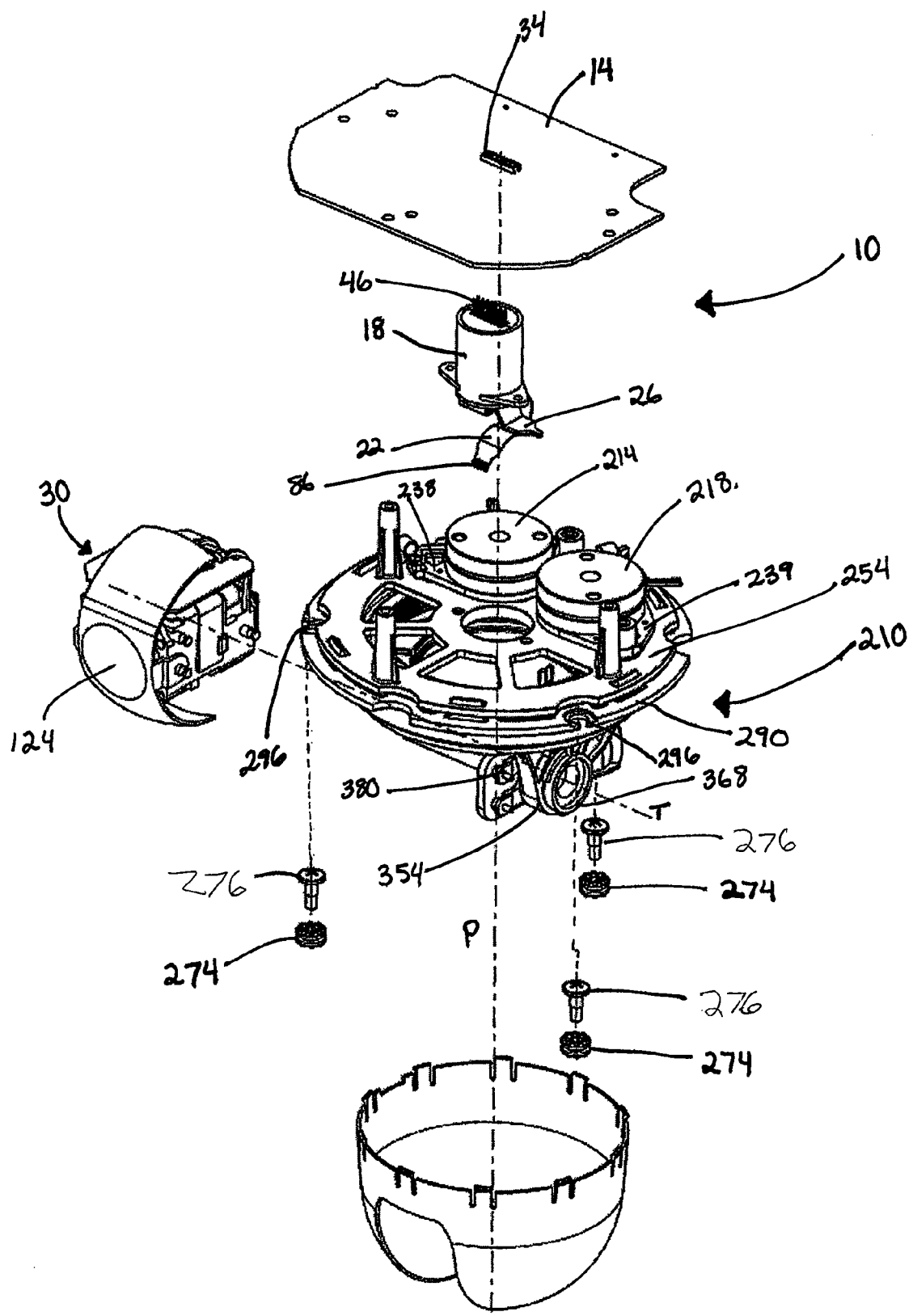
FIG. 11 is an exploded perspective view of the dome camera of FIG. 10 showing the camera module and slip ring system of FIG. 1 and the differential drive system.
Figure 12:
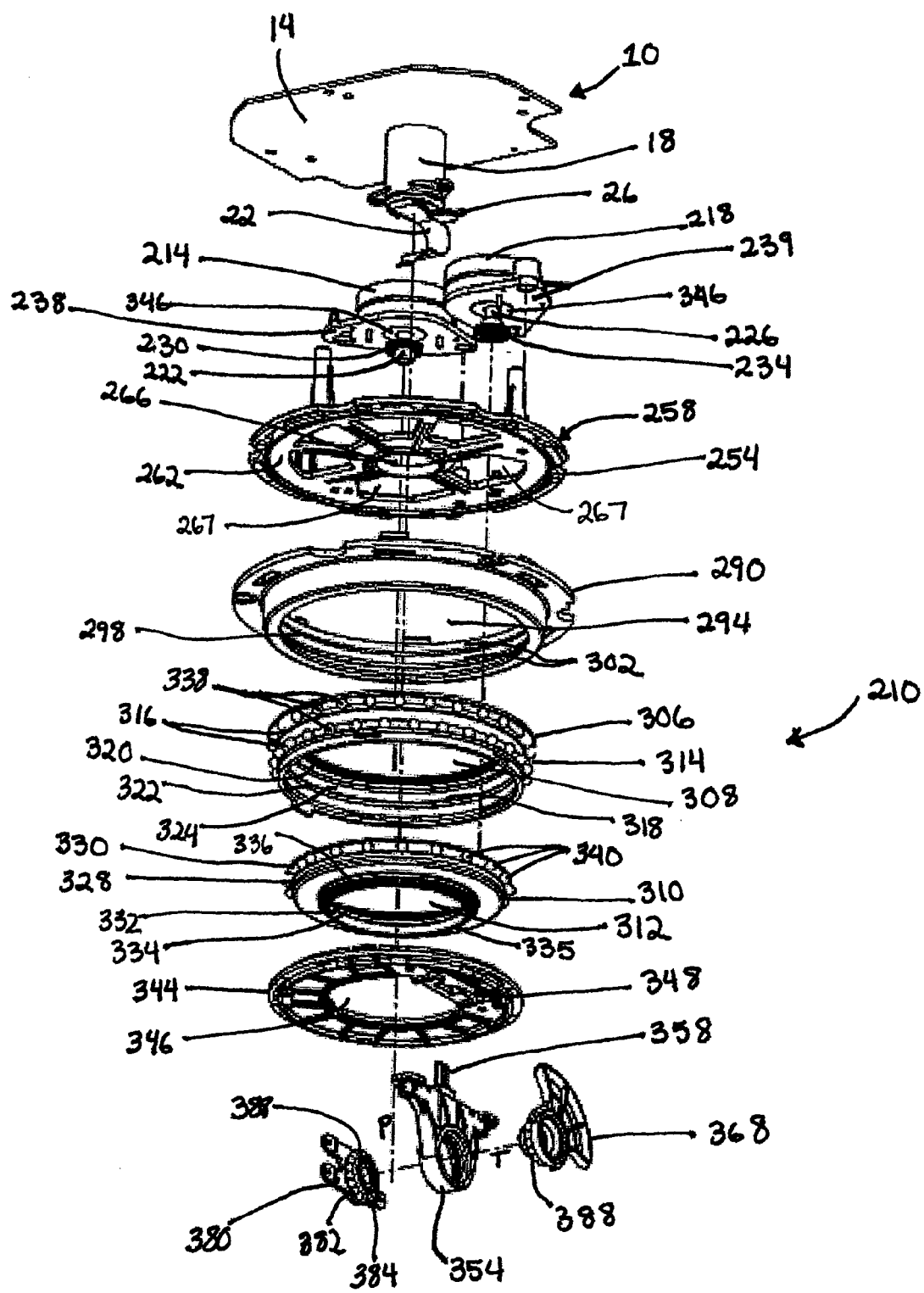
FIG. 12 is an exploded perspective view of the camera module and slip ring system of FIG. 1 and the differential drive system of FIG. 10.
Figure 13:
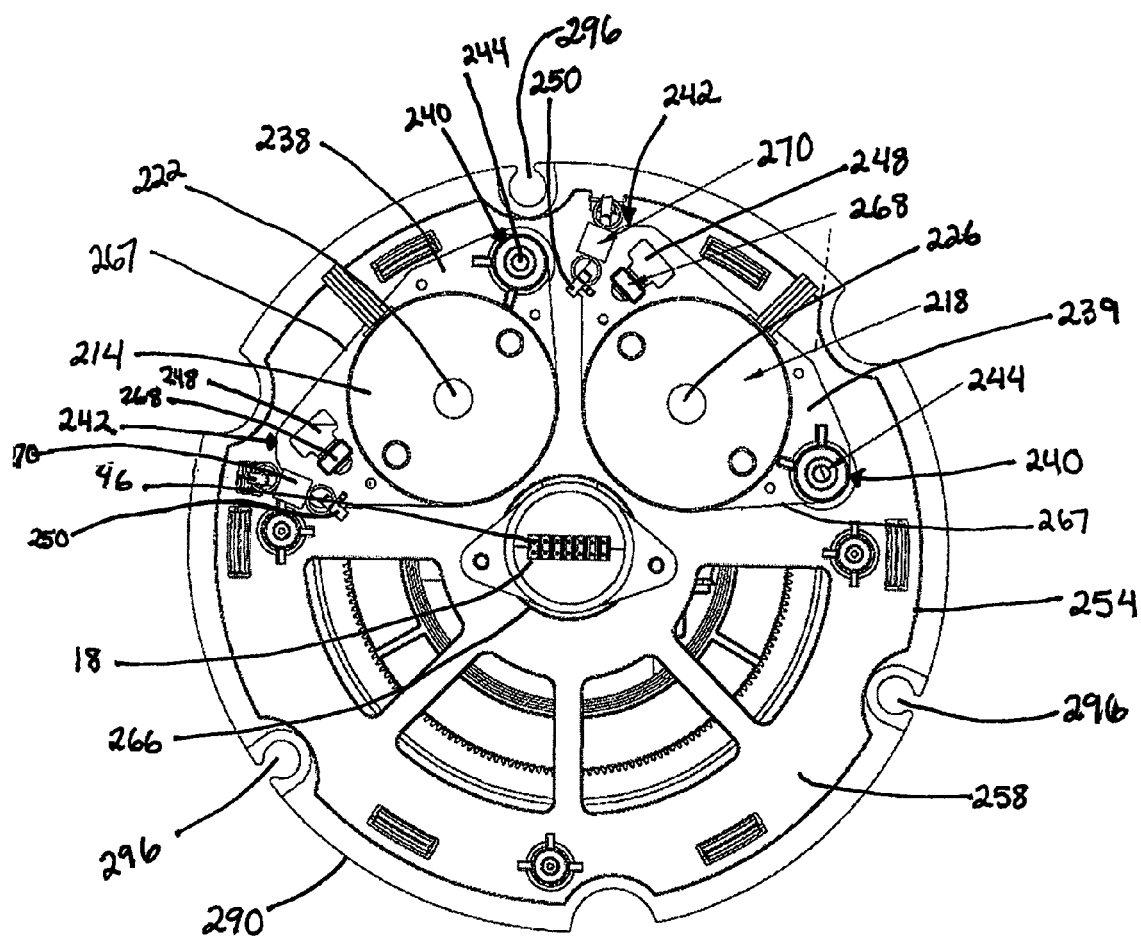
FIG. 13 is a top view of the differential drive system of FIG. 10 showing a pan motor and a tilt motor mounted on mounting plates and a support plate.
Figure 14:
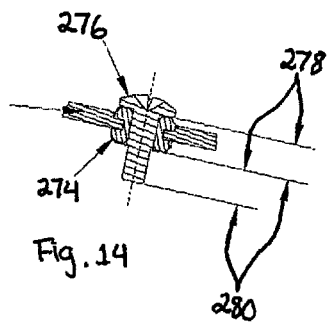
FIG. 14 is a cross-sectional view of an isolation grommet of the differential drive system of FIG. 10.

As illustrated in FIGS. 11-13, the differential drive system 210 includes a pan motor 214 and a tilt motor 218, each having a respective motor shaft 222, 226. The pan motor shaft 222 has a tooth spur gear pinion 230 (FIGS. 12 and 15) and the tilt motor shaft 226 has a tooth spur gear pinion 234 (FIG. 12). The tooth spur gear pinions 230, 234 (FIG. 12) have a toothed surface with cogs for meshing with and engaging a toothed gear. The tooth spur gear pinions 230, 234 are located on the respective motor shafts 222, 226 to engage specific components of the differential drive system 210, as described below. For the constructions herein, the motors 214, 218 and their respective shafts 222, 226 are essentially the same.

The pan and tilt motors 214, 218 are each mounted to a motor mounting plate 238, 239 and are electrically connected to the circuit board 14. The mounting plates 238 and 239 are substantially identical in the illustrated construction. Thus, for the remainder of this paragraph common reference numbers will be used for both plates 238 and 239 and the plates will be described as if they were a single element. With reference to FIG. 13, each motor mounting plate 238 includes a fixed end 240 and a pivoting end 242. The pivoting end 242 is opposite the fixed end 240 and is connected to a pivot boss 244. The motor mounting plate 238 also includes a central aperture 246 (FIG. 12), a retaining aperture 248, and a projection 250. The motor shaft 222 extends through the central aperture 246 of the motor mounting plate 238. The motor mounting plate 238 is mounted to a motor support plate 254 having an upper surface 258 and a lower surface 262. The motor support plate 254 is stationary with respect to the stationary components of the system 10 and the motor mounting plate 238 is mounted to the upper surface 258 of the motor support plate 254. In some constructions, the motor mounting plates 238 and 239 are mounted symmetrically on the motor support plate 254 (FIG. 13). The motor support plate 254 has a center aperture 266 located in substantially the center of the plate 254 and at least one shaft aperture 267 (FIG. 12). The motor mounting plate 238 is connected to the motor support plate 254 such that the fixed end 240 is connected to the motor support plate 254 by the pivot boss 244 at the pivoting end 242 and is pivotable about the pivot boss 244. A retainer tab 268 on the motor support plate 254 extends into the retaining aperture 248 of the motor mounting plate 238 and restricts the range of motion of the pivoting end 242. A tension spring 270, installed on the projection 250 of the motor mounting plate 238 and connected to the motor support plate 254, maintains a substantially constant radial force on the motor mounting plate 238.

Referring now to FIG. 12, a stationary support ring 290 having a center aperture 294 is coupled to the lower surface 262 of the motor support plate 254. In some configurations, the stationary support ring 290 has holes located about a perimeter of the support ring 290. In the construction illustrated in FIG. 13, the holes are shaped as keyholes 296 and are spaced substantially equally about the perimeter of the stationary support ring 290. The stationary support ring 290 has an inner surface 298 with annular grooves 302 running circumferentially about the inner surface 298.

As shown in FIGS. 10-14, the stationary support ring 290 is mounted to an exterior housing using isolation grommets 274. The isolation grommets 274 are formed of elastomeric material and fit concentrically between the keyhole 296 and a mounting screw 276 (or the like). The mounting screw 276 can have both unthreaded 278 and threaded 280 portions. When the fastener (screw 276) is tightened, the threaded portion 280 screws into and is tightened to the exterior housing, while the unthreaded portion 278 maintains a designed height and prevents deforming the grommet 274. The use of the isolation grommet 274 for mounting the differential drive system 210 to the exterior housing mitigates acoustic noise emanating from the system 210 without substantially altering the way the motors 214, 218 are mounted. In alternative constructions, a different element of the differential drive system 210, such as the motor support plate, has holes and is mounted to the exterior housing using the isolation grommets. In still alternative constructions, the differential drive system 210 is mounted to the exterior housing without the use of the isolation grommets 274.

Figure 15:
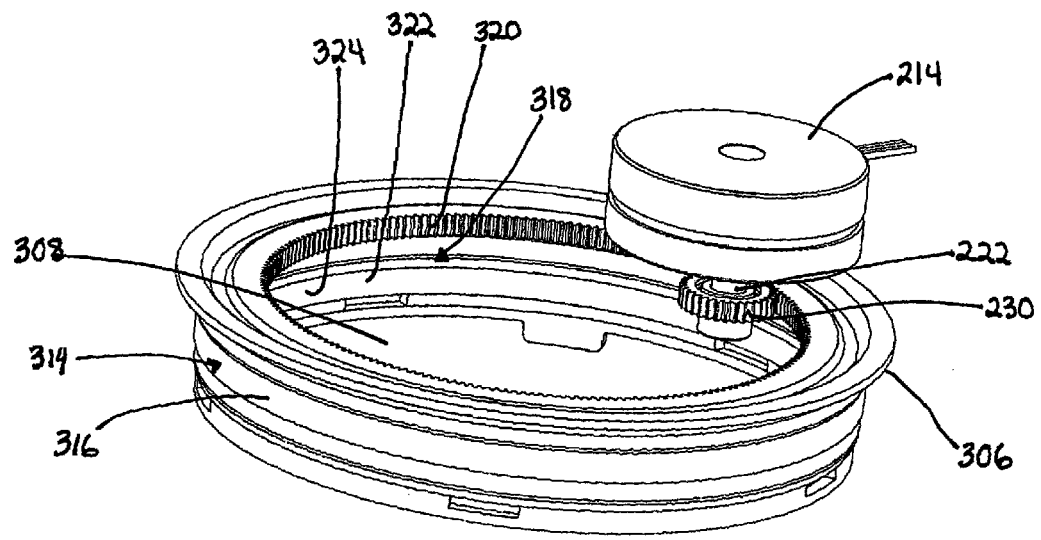
FIG. 15 is a perspective view of the pan motor engaging a pan ring of the differential drive system of FIG. 10.

The stationary support ring 290 supports, concentrically within its center aperture 294, a rotatable pan ring 306 having a center aperture 308 and a rotatable tilt ring 310 having a center aperture 312. The pan ring 306 has an outer surface 314 with annular grooves 316 running circumferentially about the surface 314. The annular grooves 316 correspond to the annular grooves 302 of the inner surface 298 of the stationary support ring 290. The pan ring 306 has an inner surface 318 including a tooth spur gear portion 320 and an annular grooved portion 322. The inner grooved portion 322 has annular grooves 324 running circumferentially about the portion 322 of the inner surface 318. The motor shaft 222 of the pan motor 214 extends through the shaft aperture 267 of the motor support plate 254 and the center aperture 294 of the stationary support ring 290. The tooth spur gear pinion 230 engages the internal tooth spur gear portion 320 of the pan ring 306, as shown in FIG. 15.

Figure 16:
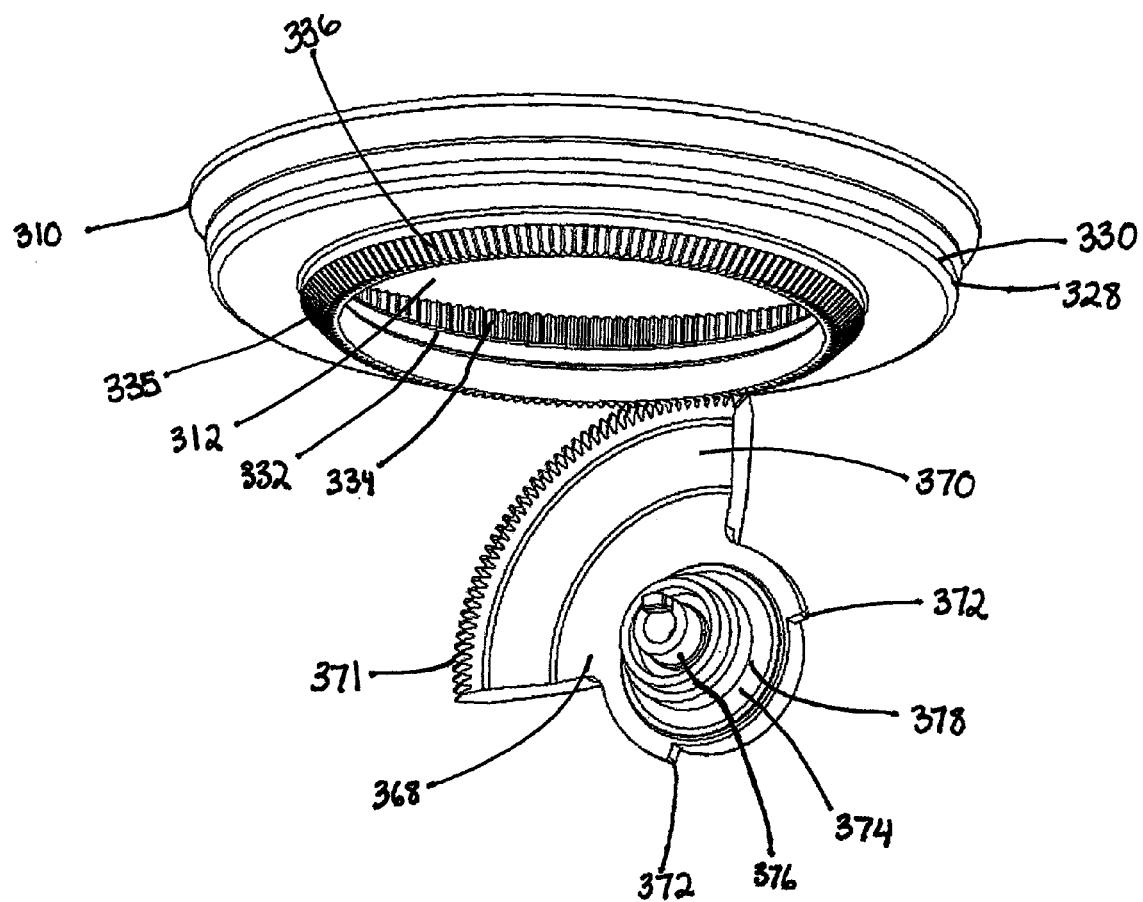
FIG. 16 is a perspective view of a tilt ring engaging a tilt gear sector of the differential drive system of FIG. 10.

Similarly, the tilt ring 310 has an outer surface 328 with annular grooves 330 running circumferentially about the outer surface 328 (see FIGS. 12 and 16). The annular grooves 330 correspond to the annular grooves 324 of the inner surface 318 of the pan ring 306. An inner surface 332 of the tilt ring 310 includes an internal tooth spur gear portion 334. The motor shaft 226 of the tilt motor 218 extends through the shaft aperture 267 of the motor support plate 254 and the center aperture 294 of the stationary support ring 290. The tooth spur gear pinion 234 engages the internal tooth spur gear portion 334 of the tilt ring 310 (similar to pan shaft 222 and tooth spur gear pinion 230 shown in FIG. 15). The tilt ring 310 also includes an angled surface 335 projecting from the outer surface 328 at an oblique angle toward the center aperture 312. The angled surface 335 is an angled tooth spur gear surface 336 (FIG. 16).

Figure 18:
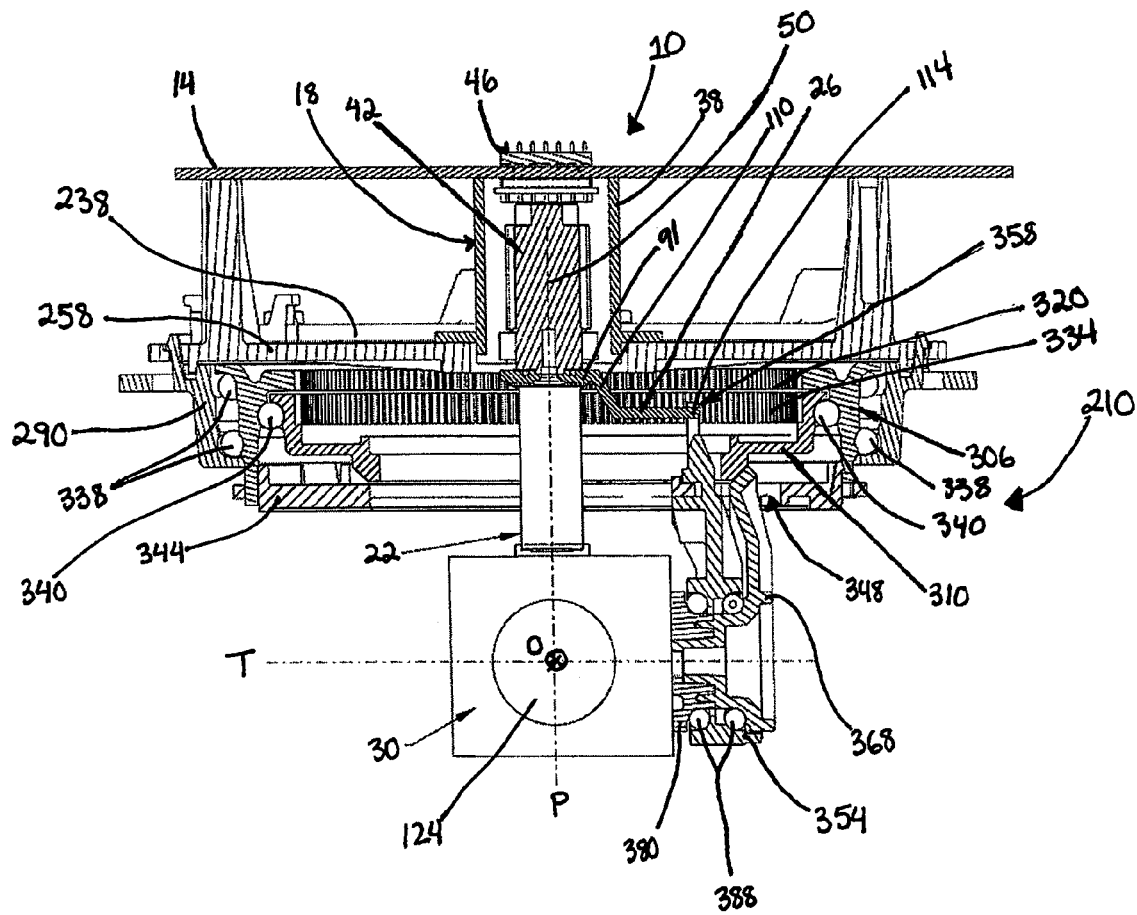
FIG. 18 is a cross-sectional view of the camera module and slip ring system of FIG. 1 coupled to the differential drive system of FIG. 10.

A set of ball bearings 338 is supported between the annular grooves 302 of the inner surface 298 of the stationary support ring 290 and the annular grooves 316 of the outer surface 314 of the pan ring 306 to allow the pan ring 306 to rotate about the pan axis P with respect to the stationary support ring 290 (see FIGS. 12 and 18). Another set of ball bearings 340 is supported between the annular grooves 324 of the inner surface 318 of the pan ring 306 and the annular grooves 330 of the outer surface 328 of the tilt ring 310 to allow the tilt ring 310 to rotate about the pan axis P with respect to the pan ring 306 and the stationary support ring 290.

A lower surface of the pan ring 306 is connected to a rotating support plate 344. The rotating support plate 344 has a center aperture 346 and a retaining aperture 348. The rotating support plate 344 is rotatable about the pan axis P with the pan ring 306.

Figure 17:
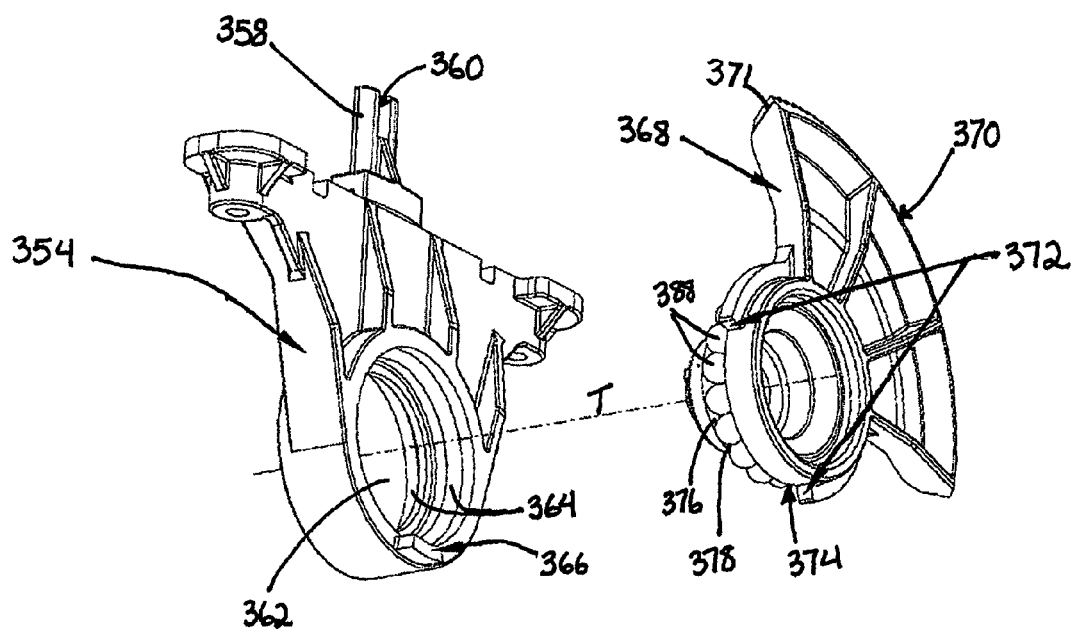
FIG. 17 is a perspective view of a tilt bracket and the tilt gear sector of the differential drive system of FIG. 10.

A tilt bracket 354 is connected to the rotating support plate 344, such as by screws or the like, so that the tilt bracket 354 is retained by and rotates with the rotating support plate 344 about pan axis P. With reference to FIG. 17, the tilt bracket 354 includes a retaining fork 358 which has an open tapered slot 360, which extends through the retaining aperture 348 of the rotating support plate 344 and into the center aperture 312 of the tilt ring 310. The tilt bracket 354 includes a tilt gear aperture 362 extending through the tilt bracket 354. The aperture 362 has annular grooves 364 running circumferential to the aperture 362, and a pair of projections 366 for limiting the tilt range of movement of the camera lens module 30, as will be described in greater detail.

A tilt gear sector 368 includes a portion 370 that extends through the retaining aperture 348 of the rotating support plate and is in mechanical contact with the tilt ring 310. The portion 370 includes an angled tooth spur gear portion 371 that meshes with and engages the angled tooth spur gear surface 336 of the tilt ring such that rotational movement of the tilt ring 310 about the pan axis P translates to rotational movement of the tilt gear sector 368 about the tilt axis T. The tilt gear sector 368 has rim stops 372 that contact the projections 366 on the tilt bracket 354 to limit the range of rotation about the tilt axis T. The stops 372 are configured to limit the tilt range of rotation to approximately 6 degrees above a horizon view (substantially 6 degrees above the original viewing axis O) through approximately 2 degrees past a vertical view (substantially 2 degrees past pan axis P). However, the stops 372 can alternatively be configured to limit the tilt rotation through a different range. Another portion 374 of the tilt gear sector 368 has an outer surface 376 that extends at least partially through the tilt gear aperture 364 and has at least one annular groove 378. The portion 374 of the tilt gear sector 368 extends through the tilt gear aperture 364 and connects to a camera lens module mounting bracket 380. The camera lens module mounting bracket 380 has a contacting surface 382 that extends at least partially through the tilt gear aperture 364 and has at least one annular groove 384. The annular grooves 378 and 384 of the tilt gear sector 368 and the mounting bracket 380, respectively, correspond with the annular grooves 364 of the tilt bracket 354 to support ball bearings 388 within the grooves 364, 378, and 384. These grooves and the ball bearings 388 allow the tilt gear sector 368 and the mounting bracket 380 to rotate relative to the tilt bracket 354 about the tilt axis T.

The camera module and slip ring system 10 is mechanically and electrically connected to the differential drive system 210 to form a camera system (or simply camera). The controller or control circuits on the circuit board 14 are connected to the pan and tilt motors 214, 218 and generate electrical signals that control the pan and tilt motors 214, 218 and electrical signals that control elements of the camera lens module 30. The slip ring 18 is connected to the motor support plate 254 such that the rotor pins 54 and the flexible flat cable 22 extend through the center aperture 266. The anti-rotation arm 26 is connected to the rotor 42 (as previously described) from below the lower surface 262 of the motor support plate 254. The coupling structure 114 is received within the open slot 360 of the retaining fork 358. The retaining fork 358 is configured to engage the coupling structure 114 to rotate the anti-rotation arm 26 during panning, initiating rotation of the rotatable elements of the system 10 with the camera lens module 30, while allowing the camera lens module 30 to rotate unobstructed during tilting. While the retaining fork 358 is shown as being connected to the tilt bracket 354, the retaining fork 358 may be attached to other parts of the camera system that rotate along with the camera lens module 30 in a pan movement. The camera lens module 30 is secured to the camera lens module mounting bracket 380, such as, for example, by screws, or the like.

As described above, the differential drive system 210 creates a substantially toroid-shaped drive with the flexible flat cable 22 and the anti-rotation arm 26 of the system 10 located in the center of the toroid-shaped drive and interfacing to the camera lens module 30. This configuration allows the camera lens module 30 and other rotating elements of the camera module and slip ring system 10 to rotate and function without interference from the pan-tilt mechanism.

Herein, the term "pan stage" is used to refer to the part of the pan-tilt mechanism that rotates about the pan axis P relative to the stationary part of the mechanism. The term "tilt stage" is used to refer to the part of the mechanism that rotates about the tilt axis T relative to the pan stage. For example, the pan stage includes the anti-rotation arm 26, the slip ring rotor 42, the flexible flat cable 22, the pan ring 306, the tilt ring 310, the rotating support plate 344, the tilt bracket 354, the tilt gear sector 368, the camera lens module mounting bracket 380, and so on. The tilt stage includes the flat flexible cable 22, the tilt gear sector 368, the camera lens module mounting bracket 380, and so on. The tilt stage is attached to the pan stage and rotates about the pan axis P, just as the tilt axis T rotates with the pan axis P, during panning of the camera lens module 30. However, the tilt stage does not rotate about the tilt axis T when the pan stage moves.

To initiate tilting of the camera lens module 30, a control circuit on the circuit board 14 sends a signal to the tilt motor 218. The motor shaft 226 of the tilt motor 218 rotates (see FIG. 19), rotating the tooth spur gear pinion 234 to engage the tooth spur gear portion 334 of the tilt ring 310. The tooth spurs of the pinion 234 are prevented from slipping out of engagement with the tooth spurs of the gear portion 334 of the tilt ring 310 by the force of the tension spring 270 (FIG. 13) biasing the pivot of the motor mounting plate 239 about the pivot boss 244. The resultant torque around the pivot point translates to a radial force of the motor pinion 234 against the internal tooth spur gear 334 being driven by the pinion 234. The engagement of the tooth spur gear pinion 234 with the tooth spur gear portion 334 of the tilt ring 310 rotates the tilt ring 310 about the pan axis P with respect to the pan stage and the stationary components of the systems 10, 210. The tilt ring 310 angled tooth spur gear surface 336 engages the angled tooth spur gear portion 371 of the tilt gear sector 368 and rotates the tilt gear sector 368 about the tilt axis T. The angled surface 335 of the tilt ring 310 applies a pressure to the tilt gear sector 368 that causes a slight deformation of the tilt gear sector. The applied load prevents the angled tooth spur gear portion 371 from slipping out of engagement with the angled tooth spur gear surface 336, to result in little to no loss of position between components and gears during rotation. The tilt gear sector 368 and the camera lens module mounting bracket 380 are connected and rotate together about the tilt axis T within the tilt gear aperture 364 of the tilt bracket 354. Since the camera lens module 30 is coupled to the camera lens module mounting bracket 380, the rotation of the camera lens module mounting bracket 380 translates to rotation or tilting of the camera lens module 30 about the tilt axis T. The projections 366 on the tilt bracket 354 and the rim stops 372 of the tilt gear sector 368 limit the tilt range of motion.

With the tilting of the camera lens module 30, the connection between the flexible flat cable 22 and the camera lens module 30 causes the second end 62 to begin to tilt, as well. In response to the tilting initiated from the second end 62, the flexible flat cable 22 flexes in the tilt region 66 with a simple rolling bend, forming a loop that can accommodate the entire tilt motion of the camera lens module 30 (see FIGS. 2 and 9). The bending of the flexible flat cable 22 is restricted to movement within one plane (the plane created by the pan axis P and the viewing axis O or O'). The flexible flat cable 22 is prevented from twisting in planes other than the one plane in order to minimize the stress during tilting of the camera lens module 30. The loop formed during flexing of the flexible flat cable 22 manages stress in the flexible flat cable 22 by distributing the pressures of flexing over the surface area of the flexible tilt region 66. The formation of the loop also helps prevent localized pressure points in the flexible flat cable 22. The cable tray 128 on the camera lens module 30 receives a portion of the flexible flat cable 22 to further manage the stress in the flexible flat cable 22 during flexing. The bend 74 of the flexible flat cable 22 in contact with the support edge 106 and at least a portion of the lower surface 96 helps manage stress in the flexible flat cable 22 by distributing the pressure associated with the tilting motion over a relatively large area.

To initiate panning of the camera lens module, control circuits on the circuit board 14 send signals to the pan motor 214 and the tilt motor 218. The motor shafts 222, 226 of the pan and tilt motors 214, 218, respectively, rotate in the same direction and at the same speed (see FIG. 19). The rotating tooth spur gear pinions 230, 234 engage the tooth spur gear portions 320, 334 of the pan ring 306 and the tilt ring 310. The tooth spurs of the pinions 230, 234 are prevented from slipping out of engagement with the tooth spurs of the gear portions 320, 334 of the pan ring 306 and the tilt ring 310 by the force of the tension spring 270 biasing the pivot of the motor mounting plate 238 about the pivot boss 244. The resultant torque around the pivot point translates to a radial force of the motor pinions 230, 234 against the internal tooth spur gears 320, 334 being driven by the pinion. The engagement of the tooth spur gear pinions 230, 234 with the tooth spur gear portions 320, 334 rotates the pan ring 306 and tilt ring 310, respectively, about the pan axis P with respect to the stationary components of the systems 10, 210. The motor support plate 254 is connected to the pan ring 306 and rotates with the pan and tilt rings 306, 310. The tilt bracket 354 is connect to the motor support plate 254 and rotates therewith, causing the tilt gear sector 368 and camera lens module mounting bracket 380 to rotate about the pan axis P as well. The camera lens module 30, which is connected to the bracket 380, also rotates.

In the disclosed construction, tooth spurs of the pinions 230, 240 have the same number of teeth, and tooth spurs of the gear portions 320, 334 have the same number of teeth, so the drive ratio is the same for both pan and tilt. Therefore, when the motors 214, 218 are driven at the same speed, the tilt ring 310 and the pan ring 306 rotate together and there is no differential motion that would tilt the camera lens module 30. The product of the speed and ratio for each stage is the same, so the same motor speed results in the same rotational speed of the tilt ring 310 relative to the pan ring 306. However, if the ratios of the pan and tilt stages are different (e.g., different number of teeth on the pinions and/or the gear portions), the drive could still work by using proportional different motor speeds to create the same speeds of the tilt ring 310 and the pan ring 306.

As the camera lens module 30 pans, the second end 62 of the flexible flat cable 22 remains connected to the camera lens module 30 and rotates substantially the same amount and direction as the camera lens module 30 and the rest of the pan stage. The engagement of the retaining fork 358 of the tilt bracket 354 with the anti-rotation arm 26 rotates the anti-rotation arm 34 substantially the same amount and direction as the camera lens module 30 and the pan stage. The first end 58 of the flexible flat cable 22 rotates with the anti-rotation arm 26. Therefore, both the first and second ends 58, 62 rotate substantially the same amount and direction about the pan axis P as the pan stage, including the camera lens module 30, which prevents twisting of the flexible flat cable 22.

The anti-rotation arm 26 and first end 58 of the flexible flat cable 22 are also connected to the rotor 42. Therefore, the rotor 42 rotates substantially the same amount and direction about the pan axis P as the camera lens module 30 and the flexible flat cable 22. The rotation of the rotor 42 and its connection to the stator 38 maintains the electrical connection between the circuit board 14 and the camera lens module 30, while allowing mechanical rotation of the flexible flat cable 22 and anti-rotation arm 26 with the camera lens module 30. The anti-rotation arm 26 also manages the strain in the flexible flat cable 22 by providing the torque to rotate the first end 58 and the rotor 42, and helping to prevent twisting of the flexible flat cable 22.

The anti-rotation arm 26 also protects the pins 54 of the rotor 42 and solder-joints from strain during panning by taking the rotary load to reduce the pressures in the pins 54 and joints.

The camera lens module 30 can be rotated with a compound tilting and panning motion. To initiate combined panning and tilting motions, the control circuit or controller on circuit board 14 sends signals to the pan motor 214 and the tilt motor 218. The panning and tilting motions are controlled as described above, except that the pan and tilt motors 214, 128 will rotate at differing speeds in order to achieve the desired pan/tilt range of motion (see FIG. 19), as dictated by the control signals. During combined tilting and panning motions, the camera lens module 30 tilts and pans as described above, with stress and strain continually managed. It should be understood that, in practice, camera movements may include multiple conditions of those shown in the FIG. 19 table in order to achieve the desired final pan and tilt positions. During manual operation, a user tends to achieve final tilt position before optimizing pan position. Whereas, when the camera is moving to a preposition "shot" under external automatic control, the pan position is often achieved first before the tilt position is achieved.

The camera module and slip ring system 10 and the differential drive system 210 can be used in a dome camera module (see FIG. 10), and can alternatively be configured to be used in another type of camera module or another type of rotating mechanism. Some configurations of the camera slip ring system 10 and the differential drive system 210 can be used in security systems. However, the camera slip ring system 10 and/or the differential drive system 210 can alternatively be used for other applications.

Thus, the invention provides, among other things, a camera and slip ring system with a differential drive mechanism. Various features and advantages of the invention are set forth in the following claims

What is claimed is:
1. A camera system comprising:
a circuit board;
a slip ring having a stator connected to the circuit board and a rotor, the rotor having pins and being rotatable with respect to the stator;
a camera lens module;
a flexible flat cable having
a first end electrically connected to the pins,
a bend adjacent the first end;
a second end electrically connected to the camera lens module, and
a flexible tilt region located between the bend and the second end, the
flexible tilt region being bendable along a length when the camera lens module tilts; and
an anti-rotation arm having a tab configured to be received in a slot of a bracket coupled to the camera lens module, the anti-rotation arm connected to the rotor and in contact with the first end of the flexible flat cable and received in the bend of the flexible flat cable, the anti-rotation arm including recesses to receive the pins and preventing a twist of the flexible flat cable during panning of the camera lens module.

2. The camera system of claim 1, further comprising a pan-tilt mechanism electrically connected to the circuit board and connected to the camera lens module and the anti-rotation arm, and wherein the anti-rotation arm rotates the first end of the flexible flat cable and the rotor the same amount and direction as the camera lens module when the pan-tilt mechanism pans the camera lens module.

3. The camera system of claim 2, wherein the pan-tilt mechanism includes a pan stage and a tilt stage, the pan stage having a retaining fork coupled to the anti-rotation arm to move the flexible flat cable and the rotor during a pan of the cameral lens module.

4. The camera system of claim 2, wherein the pan-tilt mechanism includes a tilt gear sector and a tilt bracket receiving a portion of the tilt gear sector and allowing a tilt of the camera lens module via the tilt gear sector, the tilt bracket having a retaining fork coupled with the anti-rotation arm, to engage the anti-rotation arm for moving the flexible flat cable and the rotor during a pan of the cameral lens module.

5. The camera system of claim 2, wherein the camera lens module pans about a pan axis, tilts about a tilt axis, and has a viewing axis, and wherein the flexible flat cable bends in the plane created by the viewing axis and the pan axis.

6. The camera system of claim 2, wherein the pan-tilt mechanism includes a differential drive system.

7. The camera system of claim 1, wherein the camera lens module includes a cable tray to receive a portion of the tilt region of the flexible flat cable.

8. The camera system of claim 1, wherein the flexible flat cable includes a bend wrapped around a portion of the anti-rotation arm.

9. The camera system of claim 1, further comprising:
a pan motor having a pan motor shaft;
a tilt motor having a tilt motor shaft;

a stationary ring having a center aperture, the pan and tilt motor shafts extending through the center aperture of the stationary ring;

a pan ring having a center aperture, the pan ring received within the center aperture of the stationary ring, and rotatable about a pan axis with respect to the stationary ring;

a tilt ring having a center aperture, the tilt ring received within the center aperture of the stationary ring, and rotatable about the pan axis with respect to the pan ring and to the stationary ring;

a support plate connected to the pan ring, the support plate having a center aperture and a retaining aperture;

a tilt bracket connected to the support plate, the tilt bracket having a tilt gear aperture;

a tilt gear sector having a portion extending through the retaining aperture of the support plate and in contact with the tilt ring; and a mounting bracket having a portion extending at least partially through the tilt gear aperture of the tilt bracket and connected to the tilt gear aperture, wherein rotation of the tilt motor shaft causes rotation of the tilt ring about the pan axis, rotation of the tilt gear sector, and the mounting bracket about a tilt axis, and wherein rotation of the pan motor shaft causes rotation of the pan ring, the support ring, the tilt bracket, the tilt gear sector, and the mounting bracket about the pan axis.

10. A method of connecting a camera lens module of a camera system to a circuit board using a slip ring, an anti-rotation arm, and a pan-tilt mechanism, the slip ring having a stator and a rotor, the rotor having pins and being rotatable with respect to the stator, the method comprising:

connecting the slip ring to the circuit board;
receiving the pins of the rotor in recesses of the anti-rotation arm;
electrically connecting the rotor pins to a first end of a flexible flat cable;
receiving the anti-rotation arm in a bend of the flexible flat cable;
positioning the first end of the flexible flat cable in contact with the anti-rotation arm;
electrically connecting a second end of the flexible flat cable to the camera lens module;
electrically connecting the circuit board to a pan-tilt mechanism; and
connecting the pan-tilt mechanism to the camera lens module, including sliding a tab of the anti-rotation arm into a slot of the pan-tilt mechanism to rotate the anti-rotation arm the same amount and direction as the camera lens module, and configuring the flexible flat cable to bend in one plane.

11. The method of claim 10, wherein the pan-tilt mechanism includes a pan stage and a tilt stage, and wherein the configuring the anti-rotation arm includes mating a retaining fork of the pan stage with the anti-rotation arm, and the method further comprises tilting the camera lens module without rotating the anti-rotation arm; and panning the camera lens module, including engaging the anti-rotation arm with the retaining fork to rotate the first end of the flexible flat cable and the rotor with the camera lens module.

12. The method of claim 11, wherein panning the camera lens is about the pan axis and tilting the camera lens module is about the tilt axis, and wherein the flexible flat cable bends in the plane created by a viewing axis of the camera lens module and the pan axis.

13. The method of claim 10, wherein the camera lens module includes a cable tray, and wherein the configuring the flexible flat cable includes configuring the cable tray to receive a portion of the tilt region of the flexible flat cable.

14. The method of claim 10, further comprising wrapping a portion of the flexible cable around the anti-rotation arm.

15. A differential drive system configured to pan and tilt a camera lens module about a pan and tilt axis, respectively, the tilt axis orthogonal to the pan axis, the differential drive system comprising:

a pan motor having a pan motor shaft;
a tilt motor having a tilt motor shaft;
a stationary ring having a center aperture, the pan and tilt motor shafts extending through the center aperture of the stationary ring;
a pan ring having a center aperture, the pan ring received within the center aperture of the stationary ring, and rotatable about the pan axis with respect to the stationary ring;
a tilt ring having a center aperture, the tilt ring received within the center aperture of the stationary ring, and rotatable about the pan axis with respect to the pan ring and to the stationary ring;
a support plate connected to the pan ring, the support plate having a center aperture and a retaining aperture; a tilt bracket connected to the support plate, the tilt bracket having a tilt gear aperture;
a tilt gear sector having a portion extending through the retaining aperture of the support plate and in contact with the tilt ring; and
wherein rotation of the tilt motor shaft causes rotation of the tilt ring about the pan axis, and rotation of the tilt gear sector about the tilt axis, and
wherein rotation of the pan motor shaft causes rotation of the pan ring, the support ring, the tilt bracket, and the tilt gear sector about the pan axis.

16. The differential drive system of claim 15, further comprising:

a pan motor mounting plate and a tilt motor mounting plate, the pan motor mounted to the pan motor mounting plate and the tilt motor mounted to the tilt motor mounting plate, the pan motor mounting plate and the tilt motor mounting plate each have a respective central aperture, and the pan and tilt motor shafts extend through the central apertures, respectively;
a rotating tilt ring having a center aperture, the tilt ring received within the center aperture of the stationary ring, and rotatable about the pan axis with respect to the pan ring and to the stationary ring; and
a mounting bracket having a portion extending at least partially through the tilt gear aperture of the tilt bracket and connected to the tilt gear aperture,
wherein the tilt gear sector further includes another portion extending at least partially through the tilt gear aperture of the tilt bracket.

17. The differential drive system of claim 15, wherein the camera lens module is tilted via rotation of the tilt ring, panned via rotation of the tilt ring and pan ring at the same speed, and combination panned/tilted via rotation of the tilt ring and the pan ring at different speeds until desired camera position is achieved.

18. The differential drive system of claim 15, wherein the pan motor shaft has a pan shaft gear portion in engagement with a gear portion of the pan ring for initiating rotation of the pan ring, and the tilt motor shaft has a tilt shaft gear portion in engagement with a gear portion of the tilt ring for initiating rotation of the tilt ring.

19. The differential drive system of claim 15, wherein the pan and tilt motor mounting plates each further include a fixed end and a pivoting end, the fixed end secured to the motor support plate by a pivot boss, the pivoting end including a retaining aperture and a projection; the motor support plate includes a pair of retaining tabs, each retaining tab extending into the retaining aperture of the tilt and pan motor mounting plates to limit the range of motion of the pivoting end, and a pair of projections; wherein a tension spring is connected to each of the projections of the tilt and pan motor mounting plates and to one of the projections of the motor support plate.

20. A camera system comprising:
  a circuit board;
  a slip ring having a stator connected to the circuit board and a rotor, the rotor having pins and being rotatable with respect to the stator;
  a camera lens module; a flexible flat cable having a first end electrically connected to the pins, a second end electrically connected to the camera lens module, and a flexible tilt region located between the first end and the second end, the flexible tilt region being bendable along a length when the camera lens module tilts;
  an anti-rotation arm connected to the rotor and in contact with the first end of the flexible flat cable;
  a pan motor having a pan motor shaft;
  a tilt motor having a tilt motor shaft;
  a stationary ring having a center aperture, the pan and tilt motor shafts extending through the center aperture of the stationary ring; a pan ring having a center aperture, the pan ring received within the center aperture of the stationary ring, and rotatable about the pan axis with respect to the stationary ring; a tilt ring having a center aperture, the tilt ring received within the center aperture of the stationary ring, and rotatable about the pan axis with respect to the pan ring and to the stationary ring;
  a support plate connected to the pan ring, the support plate having a center aperture and a retaining aperture;
  a tilt bracket connected to the support plate, the tilt bracket having a tilt gear aperture;
  a retaining fork coupled with the anti-rotation arm; and
  a tilt gear sector having a portion extending through the retaining aperture of the support plate and in contact with the tilt ring,
  wherein rotation of the tilt motor shaft causes rotation of the tilt ring about the pan axis, and rotation of the tilt gear sector about the tilt axis, and
  wherein rotation of the pan motor shaft causes rotation of the pan ring, the support ring, the tilt bracket, the tilt gear sector, the anti-rotation arm via the retaining fork, the flexible flat cable, and the rotor about the pan axis.

21. The camera system of claim 20, wherein the system includes a tilt stage and a pan stage, the pan stage includes the pan motor, the pan ring, the support ring, the tilt bracket, the tilt gear sector, the anti-rotation arm, the retaining fork, the flexible flat cable, and the rotor, and wherein the retaining fork couples to another member of the pan stage.

22. The camera system of claim 20, wherein the camera lens module is tilted via rotation of the tilt ring, panned via rotation of the tilt ring and pan ring at the same speed, and combination panned/tilted via rotation of the tilt ring and the pan ring at different speeds until desired camera position is achieved.

* * * * *